United States Patent
Abdelghaffar et al.

(10) Patent No.: US 12,107,656 B2
(45) Date of Patent: Oct. 1, 2024

(54) BEAM CONFIGURATION INDICATION FOR A DOWNLINK CONTROL CHANNEL

(71) Applicant: QUALCOMM INCORPORATED, San Diego, CA (US)

(72) Inventors: Muhammad Sayed Khairy Abdelghaffar, San Jose, CA (US); Runxin Wang, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/759,776

(22) PCT Filed: Mar. 26, 2020

(86) PCT No.: PCT/CN2020/081300
§ 371 (c)(1),
(2) Date: Jul. 29, 2022

(87) PCT Pub. No.: WO2021/189337
PCT Pub. Date: Sep. 30, 2021

(65) Prior Publication Data
US 2023/0062459 A1     Mar. 2, 2023

(51) Int. Cl.
*H04L 1/02* (2006.01)
*H04B 7/06* (2006.01)
*H04W 72/23* (2023.01)

(52) U.S. Cl.
CPC .......... *H04B 7/0695* (2013.01); *H04W 72/23* (2023.01)

(58) Field of Classification Search
CPC .. H04B 7/0695; H04B 7/0408; H04B 7/0617; H04W 16/28; H04W 72/23; H04W 72/02; H04L 5/0023; H04L 5/0057
(Continued)

(56) References Cited

U.S. PATENT DOCUMENTS

| 11,564,233 B2 * | 1/2023 | Zhang | H04W 76/27 |
| 2019/0268787 A1 * | 8/2019 | Guan | H04B 7/0628 |

(Continued)

FOREIGN PATENT DOCUMENTS

| CN | 106879010 A | 6/2017 |
| CN | 107889130 A | 4/2018 |

(Continued)

OTHER PUBLICATIONS

Supplementary European Search Report—EP20926505—Search Authority—Munich—Dec. 6, 2023 (203138EP).

(Continued)

*Primary Examiner* — Khai Tran
(74) *Attorney, Agent, or Firm* — Arun Swain

(57) ABSTRACT

Methods, systems, and devices for wireless communications are described to indicate a single frequency network (SFN) mode and associated composite channel reference signals to a user equipment (UE). A UE and a base station may communicate via two or more transmission and reception points (TRPs) using an SFN transmission, which may represent a transmission having multiple beam configurations. The base station may transmit a configuration associated with a control channel that explicitly or implicitly indicates whether control channel transmissions are associated with an SFN mode or are configured with multiple candidate beam configurations. The base station may transmit an indication of activated beam configurations for the control channel. The UE may receive one or more reference signals from each TRP and, based on the SFN indication, may use information from the one or more reference signals to receive the control channel transmission.

28 Claims, 17 Drawing Sheets

(58) Field of Classification Search
USPC .................................. 375/267, 260, 262
See application file for complete search history.

(56) References Cited

U.S. PATENT DOCUMENTS

| | | | | |
|---|---|---|---|---|
| 2020/0021389 | A1* | 1/2020 | Guan | H04B 7/0695 |
| 2020/0314857 | A1* | 10/2020 | Pezeshki | H04W 72/53 |
| 2020/0383167 | A1* | 12/2020 | Sengupta | H04W 74/0833 |
| 2022/0166467 | A1* | 5/2022 | Black | H04B 7/0413 |
| 2022/0408446 | A1* | 12/2022 | Zirwas | H04W 24/08 |

FOREIGN PATENT DOCUMENTS

| | | |
|---|---|---|
| CN | 109803427 A | 5/2019 |
| CN | 110249573 A | 9/2019 |
| EP | 3512235 A1 | 7/2019 |
| WO | WO-2018143702 A1 | 8/2018 |
| WO | WO-2020033549 A1 | 2/2020 |

OTHER PUBLICATIONS

International Search Report and Written Opinion—PCT/CN2020/081300—ISA/EPO—Dec. 23, 2020 (203138WO1).
ZTE: "Enhancements on Multi-Beam Operation", 3GPP Draft, 3GPP TSG RAN WG1 Meeting #96bis, R1-1904014, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Mar. 30, 2019 (Mar. 30, 2019), XP051691228, 17 pages, Retrieved from the Internet: URL: http://www.3gpp.org/ftp/tsg%5Fran/WG1%5FRL1/TSGR1%5F96b/Docs/R1%2D1904014%2Ezip, p. 4-p. 6.

* cited by examiner

| Serving Cell ID 405 | | CORESET ID 410 |
|---|---|---|
| CORESET ID 410 | TCI State ID 415-a | TCI State ID 415-b |

BEAM CONFIGURATION INDICATION FOR A DOWNLINK CONTROL CHANNEL

CROSS REFERENCE

The present application is a 371 national stage filing of International PCT Application No. PCT/CN2020/081300 by ABDELGHAFFAR et al. entitled "BEAM CONFIGURATION INDICATION FOR A DOWNLINK CONTROL CHANNEL," filed Mar. 26, 2020, which is assigned to the assignee hereof, and which is expressly incorporated by reference in its entirety herein.

FIELD OF TECHNOLOGY

The following relates generally to wireless communications and more specifically to beam configuration indication for a downlink control channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station and a UE may communicate via multiple transmission and reception points (TRPs) for a downlink transmission. In some cases, the TRPs may be transparent to the UE such that the UE may fail to receive or identify one or more reference signals from different TRPs.

SUMMARY

The described techniques relate to improved methods, systems, devices, and apparatuses that support beam configuration indication for a downlink control channel. Generally, the described techniques provide for indicating a single frequency network (SFN) mode and associated composite channel reference signals to a user equipment (UE). A UE and a base station may communicate via two or more transmission and reception points (TRPs), for example, to improve communication quality, speed, or throughput via SFN transmissions. Though SFN mode is used herein, SFN mode may refer more generally to a mode of operation where multiple TRPs provide a joint transmission (e.g., a joint, concurrent, or simultaneous, etc., transmission) on a same set of time and frequency resources. The base station may transmit a configuration associated with a control channel that indicates whether control channel transmissions are associated with an SFN mode, where the indication of the SFN mode may be explicit or implicit. The UE may receive one or more reference signals from each TRP and, based on the SFN indication, may determine that each of the one or more reference signals is associated with the control channel transmission (e.g., via a quasi co-location (QCL) state, mode, or relationship). The UE may use information from the one or more reference signals (e.g., channel estimation information) to receive the control channel transmission (e.g., a control signal on the control channel).

An SFN mode may be represented as a channel configuration including multiple beam configurations or multiple candidate beam configurations (e.g., one beam configuration for each TRP). In a first example, the SFN mode may be explicitly indicated as enabled or disabled in the configuration. The configuration may also configure a number of transmission configuration indicator (TCI) states for control channel that may be used to respectively indicate QCL information for the TRPs. The base station may also transmit control signaling to indicate or activate a beam configuration for each TRP communicating with the UE. In a second example, the configuration may implicitly indicate the SFN mode for the control channel. For example, the configuration may configure a TCI state for the control channel such that the TCI state indicates two or more types of reference signals for a QCL type, relationship, or state. In some cases, the configuration may implicitly indicate the SFN mode for the control channel transmission by indicating an SFN mode for a shared channel transmission to the UE, where the UE may use a same configuration (e.g., same TCI states, QCL states or modes, or associated reference signals) for the control channel transmission as for the shared channel transmission.

A method of wireless communication at a UE is described. The method may include receiving, from a base station, an indication of a set of candidate beam configurations for a control channel, the control channel associated with transmissions via two or more TRPs, receiving an indication to activate, for the control channel, two or more beam configurations based on the set of candidate beam configurations, and receiving, according to the two or more activated beam configurations, a control signal on the control channel.

An apparatus for wireless communication at a UE is described. The apparatus may include a processor, memory coupled with the processor, and instructions stored in the memory. The instructions may be executable by the processor to cause the apparatus to receive, from a base station, an indication of a set of candidate beam configurations for a control channel, the control channel associated with transmissions via two or more TRPs, receive an indication to activate, for the control channel, two or more beam configurations based on the set of candidate beam configurations, and receive, according to the two or more activated beam configurations, a control signal on the control channel.

Another apparatus for wireless communication at a UE is described. The apparatus may include means for receiving, from a base station, an indication of a set of candidate beam configurations for a control channel, the control channel associated with transmissions via two or more TRPs, receiving an indication to activate, for the control channel, two or more beam configurations based on the set of candidate beam configurations, and receiving, according to the two or more activated beam configurations, a control signal on the control channel.

A non-transitory computer-readable medium storing code for wireless communication at a UE is described. The code may include instructions executable by a processor to receive, from a base station, an indication of a set of candidate beam configurations for a control channel, the control channel associated with transmissions via two or more TRPs, receive an indication to activate, for the control channel, two or more beam configurations based on the set of candidate beam configurations, and receive, according to the two or more activated beam configurations, a control signal on the control channel.

In some examples of the method, apparatuses, and non-transitory computer-readable medium described herein, receiving the indication of the set of candidate beam configurations for the control channel may include operations, features, means, or instructions for receiving signaling configuring the control channel for an SFN mode.

In some examples of the method, apparatuses, and non-transitory computer-readable medium described herein, the signaling configuring the control channel for the SFN mode configures the SFN mode for one or more of a search space associated with the control channel or a bandwidth part (BWP) associated with the control channel.

In some examples of the method, apparatuses, and non-transitory computer-readable medium described herein, receiving the indication of the set of candidate beam configurations for the control channel may include operations, features, means, or instructions for receiving signaling configuring two or more downlink reference signals for a QCL type of a TCI state for the control channel.

Some examples of the method, apparatuses, and non-transitory computer-readable medium described herein may further include operations, features, means, or instructions for receiving, via the signaling, an indication of two or more instances of QCL information for the QCL type, each instance of QCL information associated with a respective downlink reference signal of the two or more downlink reference signals.

Some examples of the method, apparatuses, and non-transitory computer-readable medium described herein may further include operations, features, means, or instructions for receiving, via the signaling, an indication that an instance of QCL information for the QCL type may be associated with the two or more downlink reference signals.

In some examples of the method, apparatuses, and non-transitory computer-readable medium described herein, the indication of the set of candidate beam configurations for the control channel may include operations, features, means, or instructions for receiving an indication of a second set of candidate beam configurations for a shared channel associated with the control channel, the second set of beam configurations including the set of candidate beam configurations.

In some examples of the method, apparatuses, and non-transitory computer-readable medium described herein, receiving the indication to activate the two or more beam configurations may include operations, features, means, or instructions for receiving an indication to activate each of the set of candidate beam configurations for the control channel, where the set of candidate beam configurations includes the two or more activated beam configurations.

In some examples of the method, apparatuses, and non-transitory computer-readable medium described herein, receiving the indication to activate the two or more beam configurations may include operations, features, means, or instructions for receiving an indication to activate one of the set of candidate beam configurations for the control channel and one or more other beam configurations.

In some examples of the method, apparatuses, and non-transitory computer-readable medium described herein, receiving the indication to activate the two or more beam configurations may include operations, features, means, or instructions for receiving an indication to activate two or more of the set of candidate beam configurations for the control channel, the two or more of the set of candidate beam configurations including the two or more activated beam configurations.

In some examples of the method, apparatuses, and non-transitory computer-readable medium described herein, receiving the indication to activate the two or more beam configurations may include operations, features, means, or instructions for receiving an indication to activate two or more other beam configurations different from any of the set of candidate beam configurations for the control channel, the two or more other beam configurations including the two or more activated beam configurations.

In some examples of the method, apparatuses, and non-transitory computer-readable medium described herein, receiving the indication may include operations, features, means, or instructions for receiving a control resource set (CORESET) configuration indicating the set of candidate beam configurations for the control channel.

In some examples of the method, apparatuses, and non-transitory computer-readable medium described herein, the CORESET configuration indicates that more than sixty-four TCI states may be configurable for the control channel.

In some examples of the method, apparatuses, and non-transitory computer-readable medium described herein, the set of candidate beam configurations may be associated with an SFN state.

In some examples of the method, apparatuses, and non-transitory computer-readable medium described herein, the indication of the set of candidate beam configurations may be received in RRC (RRC) signaling.

In some examples of the method, apparatuses, and non-transitory computer-readable medium described herein, the indication to activate the two or more beam configurations may be received in a medium access control (MAC) control element (CE).

A method of wireless communication at a base station is described. The method may include transmitting, to a UE, an indication of a set of candidate beam configurations for a control channel, the control channel associated with transmissions from two or more TRPs, determining, based on the set of candidate beam configurations, two or more beam configurations to activate for the control channel, transmitting an indication to activate, for the control channel, the two or more beam configurations, and transmitting, via the two or more TRPs based on the two or more activated beam configurations, a control signal on the control channel.

An apparatus for wireless communication at a base station is described. The apparatus may include a processor, memory coupled with the processor, and instructions stored in the memory. The instructions may be executable by the processor to cause the apparatus to transmit, to a UE, an indication of a set of candidate beam configurations for a control channel, the control channel associated with transmissions from two or more TRPs, determine, based on the set of candidate beam configurations, two or more beam configurations to activate for the control channel, transmit an indication to activate, for the control channel, the two or more beam configurations, and transmit, via the two or more TRPs based on the two or more activated beam configurations, a control signal on the control channel.

Another apparatus for wireless communication at a base station is described. The apparatus may include means for transmitting, to a UE, an indication of a set of candidate beam configurations for a control channel, the control channel associated with transmissions from two or more TRPs, determining, based on the set of candidate beam configurations, two or more beam configurations to activate for the control channel, transmitting an indication to activate, for the control channel, the two or more beam configurations, and transmitting, via the two or more TRPs based on the two or more activated beam configurations, a control signal on the control channel.

A non-transitory computer-readable medium storing code for wireless communication at a base station is described. The code may include instructions executable by a processor to transmit, to a UE, an indication of a set of candidate beam configurations for a control channel, the control channel associated with transmissions from two or more TRPs, determine, based on the set of candidate beam configurations, two or more beam configurations to activate for the control channel, transmit an indication to activate, for the control channel, the two or more beam configurations, and transmit, via the two or more TRPs based on the two or more activated beam configurations, a control signal on the control channel.

In some examples of the method, apparatuses, and non-transitory computer-readable medium described herein, transmitting the indication of the set of candidate beam configurations for the control channel may include operations, features, means, or instructions for transmitting signaling configuring the control channel for an SFN mode.

In some examples of the method, apparatuses, and non-transitory computer-readable medium described herein, the signaling configuring the control channel for the SFN mode configures the SFN mode for one or more of a search space associated with the control channel or a BWP associated with the control channel.

In some examples of the method, apparatuses, and non-transitory computer-readable medium described herein, transmitting the indication of the set of candidate beam configurations for the control channel may include operations, features, means, or instructions for transmitting signaling configuring two or more downlink reference signals for a QCL type of a TCI state for the control channel.

Some examples of the method, apparatuses, and non-transitory computer-readable medium described herein may further include operations, features, means, or instructions for transmitting, via the signaling, an indication of two or more instances of QCL information for the QCL type, each instance of QCL information associated with a respective downlink reference signal of the two or more downlink reference signals.

Some examples of the method, apparatuses, and non-transitory computer-readable medium described herein may further include operations, features, means, or instructions for transmitting, via the signaling, an indication that an instance of QCL information for the QCL type may be associated with the two or more downlink reference signals.

In some examples of the method, apparatuses, and non-transitory computer-readable medium described herein, transmitting the indication of the set of candidate beam configurations for the control channel may include operations, features, means, or instructions for transmitting an indication of a second set of candidate beam configurations for a shared channel associated with the control channel, the second set of beam configurations including the set of candidate beam configurations.

In some examples of the method, apparatuses, and non-transitory computer-readable medium described herein, transmitting the indication to activate the two or more beam configurations may include operations, features, means, or instructions for transmitting an indication to activate each of the set of candidate beam configurations for the control channel, where the set of candidate beam configurations includes the two or more activated beam configurations.

In some examples of the method, apparatuses, and non-transitory computer-readable medium described herein, transmitting the indication to activate the two or more beam configurations may include operations, features, means, or instructions for transmitting an indication to activate one of the set of candidate beam configurations for the control channel and one or more other beam configurations.

In some examples of the method, apparatuses, and non-transitory computer-readable medium described herein, transmitting the indication to activate the two or more beam configurations may include operations, features, means, or instructions for transmitting an indication to activate two or more of the set of candidate beam configurations for the control channel, the two or more of the set of candidate beam configurations including the two or more activated beam configurations.

In some examples of the method, apparatuses, and non-transitory computer-readable medium described herein, transmitting the indication to activate the two or more beam configurations may include operations, features, means, or instructions for transmitting an indication to activate two or more other beam configurations different from any of the set of candidate beam configurations for the control channel, the two or more other beam configurations including the two or more activated beam configurations.

In some examples of the method, apparatuses, and non-transitory computer-readable medium described herein, transmitting the indication may include operations, features, means, or instructions for transmitting a CORESET configuration indicating the set of candidate beam configurations for the control channel.

In some examples of the method, apparatuses, and non-transitory computer-readable medium described herein, the CORESET configuration indicates that more than sixty-four TCI states may be configurable for the control channel.

In some examples of the method, apparatuses, and non-transitory computer-readable medium described herein, the set of candidate beam configurations may be associated with an SFN state.

In some examples of the method, apparatuses, and non-transitory computer-readable medium described herein, the indication of the set of candidate beam configurations may be transmitted in RRC signaling.

In some examples of the method, apparatuses, and non-transitory computer-readable medium described herein, the indication to activate the two or more beam configurations may be transmitted in a MAC CE.

DETAILED DESCRIPTION

Figure 1:
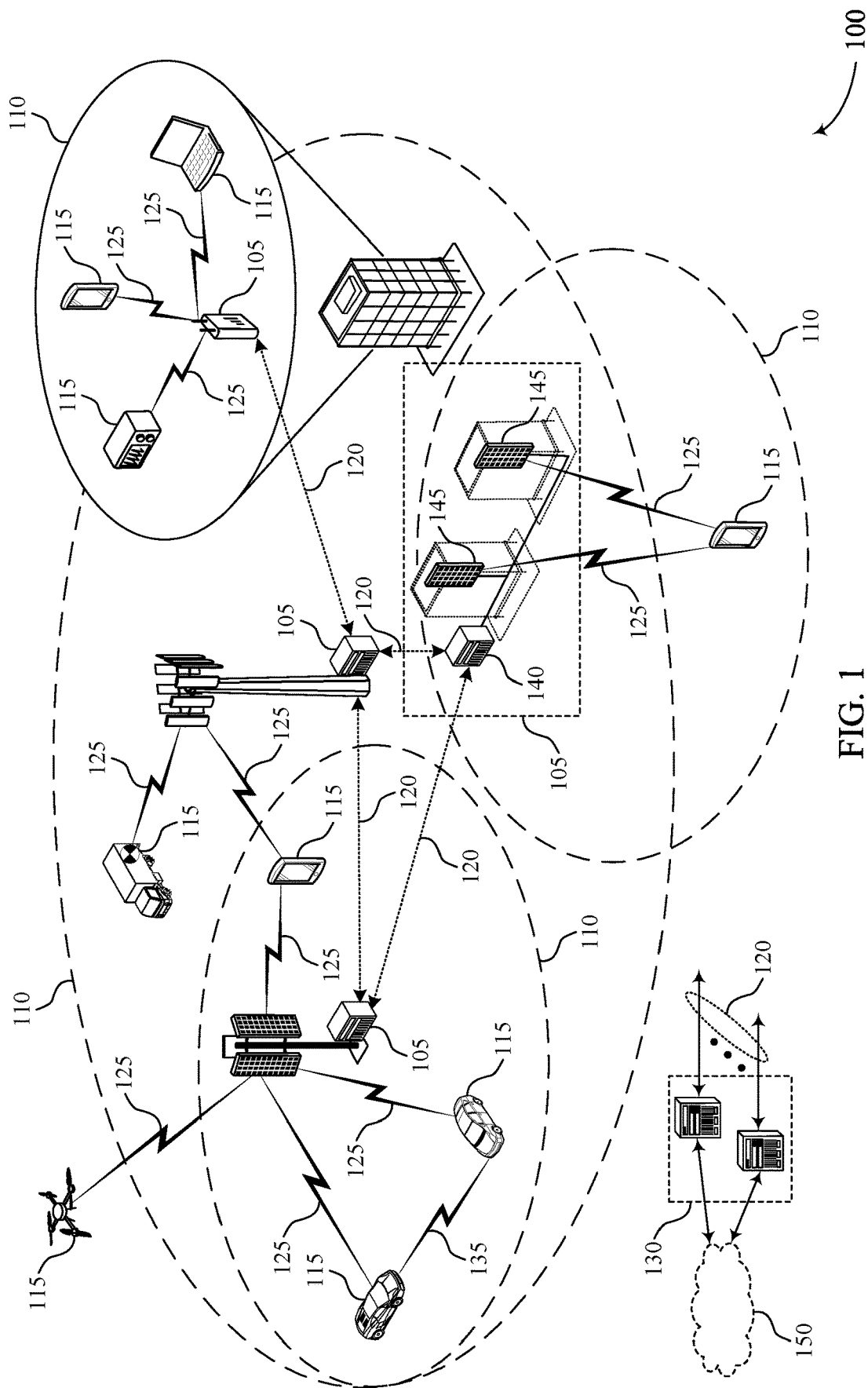
FIG. 1 illustrates an example of a wireless communications system in accordance with aspects of the present disclosure.

A user equipment (UE) and a base station may communicate via two or more transmission and reception points (TRPs), for example, to improve communication quality, speed, or throughput. For example, a UE and a base station may communicate via a first TRP and a second TRP corresponding to the base station (e.g., when the UE 115 is located in a high speed train (HST)). While the examples described herein refer to two TRPs, it is to be understood that the same examples may also apply to any number of TRPs (e.g., greater than two TRPs). In some cases, the first and second TRPs may concurrently or simultaneously transmit a same downlink signal to the UE using a same frequency. Such downlink signals may be referred to as single frequency network (SFN) signals or signals having or operating according to an SFN mode (e.g., SFNed signals). In some cases, the UE may receive SFN downlink signals as if the UE were receiving a single downlink signal (e.g., from the perspective of the UE, the UE may not distinguish or may be unable to distinguish between SFN signals (e.g., SFNed downlink data signals) received from one TRP and SFN signals (e.g., corresponding SFNed downlink data signals) received from a second TRP). Though SFN mode is used herein, SFN mode may refer more generally to a mode of operation where multiple TRPs provide a transmission (e.g., a joint, concurrent, or simultaneous, etc., transmission) on a same set of time and frequency resources. As such, where "SFN mode" is used herein, other terms referring to the equivalent techniques may be substituted herein.

Communications between the UE and the first and second TRPs may represent multi-antenna transmissions, where the first and second TRPs may concurrently or simultaneously transmit downlink information to the UE, for example, using an SFN mode. In some cases, SFN transmissions from the first and second TRPs to the UE (e.g., control channel signals, shared channel signals, or both) may represent a composite (which may also be referred to as combined, joint, etc.) channel that may be estimated using quasi co-location (QCL) state information or one or more other channel properties, among other examples. As used herein QCL state may refer to one more QCL relationships, and may also refer to or be referred to as a QCL mode. In some cases, the first and second TRPs may be associated with different downlink channel properties (e.g., spatial or other transmission properties, such as different QCL states), such that if the UE is unaware of the SFN mode, the UE may be unable to decode or receive the respective signals from the first and second TRPs using a corresponding composite channel.

For example, if the UE is unaware of the SFN mode, the UE may expect to receive one set of reference signals for the channel instead of two sets of reference signals for the composite channel (e.g., one for each TRP). If the UE is unaware of the SFN mode, the UE may process communications according to the one set of reference signals, which may result in communication errors or reduced communication quality, speed, or throughput. Accordingly, the present disclosure provides techniques for indicating an SFN mode and composite channel reference signals to a UE.

For example, the base station may transmit a configuration associated with a control channel that indicate whether control channel transmissions are associated with an SFN mode, where the indication of the SFN mode may be explicit or implicit. In a first example, the SFN mode may be explicitly indicated as enabled or disabled in the configuration. The configuration may also configure a number of transmission configuration indicator (TCI) states for control channel that may be used to respectively indicate QCL information for the first and second TRPs. The base station may also transmit control signaling to indicate or activate a TCI state for each TRP communicating with the UE.

In a second example, the configuration may implicitly indicate the SFN mode for the control channel. For example, the configuration may configure a TCI state for the control channel such that the TCI state indicates two or more types of reference signals for a QCL type or state. If the UE receives a configuration that indicates multiple reference signals for a QCL type, the UE may determine that an associated control channel transmission is SFNed. In order to indicate the multiple reference signals, the TCI state may be associated with multiple instances of QCL information that may each be associated with a reference signal, or a QCL type of the TCI state may be associated with one instance of QCL information, and the instance of QCL information may be associated with multiple reference signals. In some cases, the configuration may implicitly indicate the SFN mode for the control channel transmission by indicating an SFN mode for a shared channel transmission to the UE, where the UE may use a same configuration (e.g., same TCI states, QCL states, or associated reference signals) for the control channel transmission as for the shared channel transmission.

In the examples described herein, the UE may determine that the SFN mode is enabled for the control channel transmission, for example, based on an implicit or explicit indication in the configuration. The UE may receive one or more reference signals from each TRP and, based on the SFN indication, may determine that each of the one or more reference signals is associated with the control channel transmission (e.g., via a QCL state or relationship). The UE may use information from the one or more reference signals (e.g., channel estimation information) to receive the control channel transmission (e.g., a control signal on the control channel).

Aspects of the disclosure are initially described in the context of wireless communications systems. Aspects of the disclosure are further illustrated by and described with reference to signaling schemes, control information, a process flow, apparatus diagrams, system diagrams, and flowcharts that relate to beam configuration indication for a downlink control channel.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more TCI states may be configured and activated for a UE 115 for a downlink transmission from a base station 105 (e.g., a downlink shared channel transmission or a downlink control channel transmission). The one or more TCI states may be configured, for example, via RRC signaling, where up to 64 TCI states may be configured for a control channel and up to 128 TCI states may be configured for a shared channel. A MAC control element (CE) and a DCI may be transmitted to the UE to activate a TCI state for the shared channel and a MAC CE may be transmitted to the UE to activate a TCI state for the control channel. A TCI state may include parameters for configuring a QCL relationship between one or two downlink reference signals and DMRS ports of the shared channel, the control channel, or a CSI-RS resource. The TCI state may indicate a QCL relationship for a first downlink reference signal (e.g., QCL Type-1) and a QCL relationship for a second downlink reference signal (e.g., QCL Type-2), such that up to two QCL relationships may be configured for a TCI state.

In some cases, a UE 115 may be configured with one TCI state for a CORESET of the control channel, such that the UE 115 may assume that the QCL relationship between the control channel and the downlink reference signal(s) is specified by the TCI state. In such cases, the UE 115 may identify an active TCI state with or without an activation from a MAC CE. In some other cases, multiple TCI states may be configured for the CORESET, such that a MAC CE may be used to activate a TCI state for the control channel and identify a TCI state for the UE 115 to apply to transmissions on the control channel. In some cases, the UE 115 may not receive a MAC CE and may be configured with multiple TCI states. In such cases, the UE 115 may assume a QCL relationship for the control channel and the downlink reference signal(s) that was selected during an initial access procedure (e.g., a default TCI based on beam sweeping).

A UE 115 and a base station 105 may communicate via two or more TRPs, for example, to improve communication quality, speed, or throughput via SFN transmissions. The base station 105 may transmit a configuration associated with a control channel that indicates whether control channel transmissions are associated with an SFN mode, where the indication of the SFN mode may be explicit or implicit. The UE 115 may receive one or more reference signals from each TRP and, based on the SFN indication, may determine that each of the one or more reference signals is associated with the control channel transmission (e.g., via a QCL state or relationship). The UE 115 may use information from the one or more reference signals (e.g., channel estimation information) to receive the control channel transmission (e.g., a control signal on the control channel).

Figure 2:
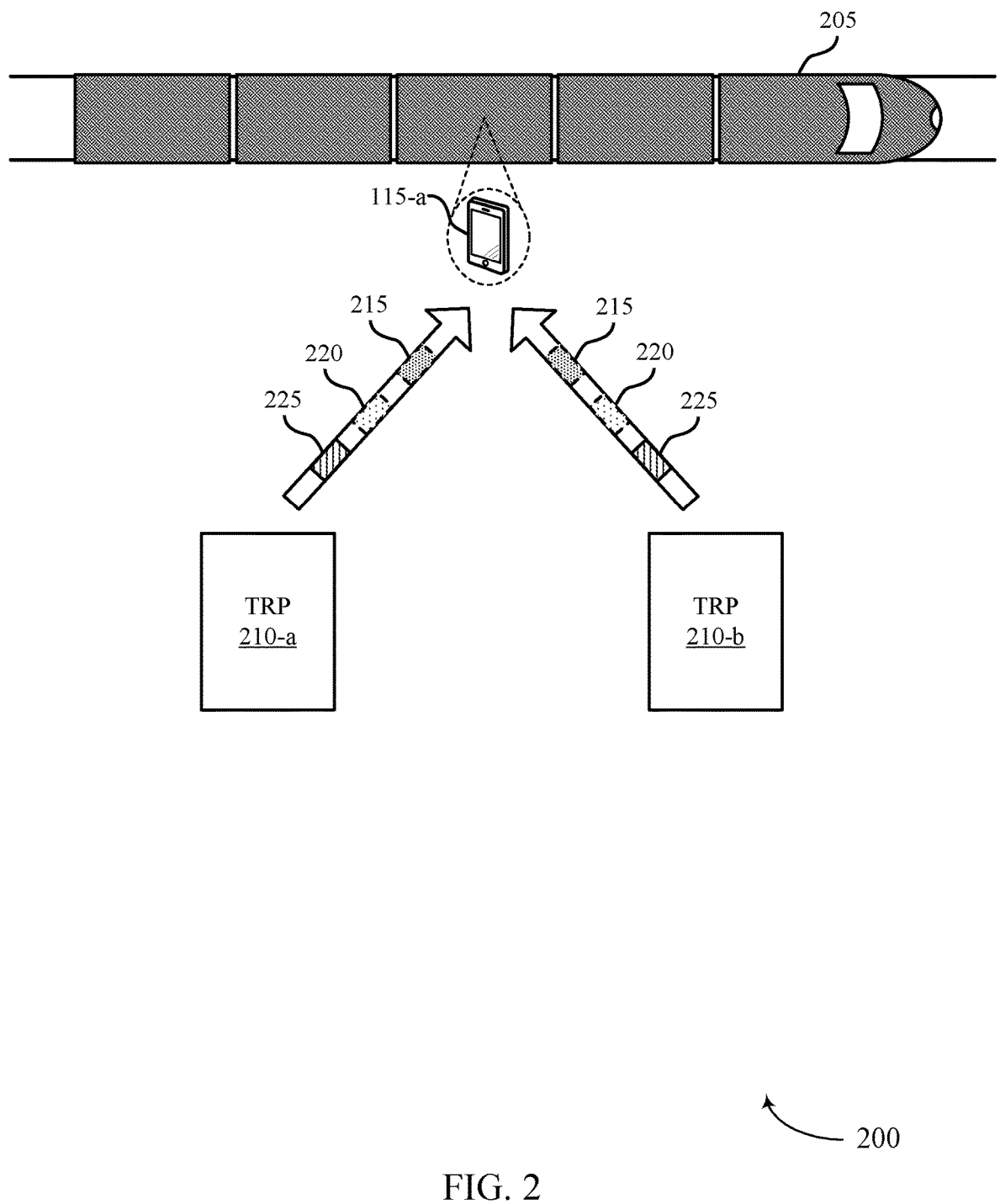
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. For example, wireless communications system 200 may include a UE 115-*a* and a base station 105 (not shown), which may be examples of a UE 115 and base station 105 described with reference to FIG. 1. Wireless communications system 200 may also include two or more TRPs 210, where UE 115-*a* may communicate with the base station 105 via at least the two or more TRPs 210. For example, wireless communications system 200 may include TRP 210-*a* and TRP 210-*b*, which may correspond to the base station 105. While the examples described herein refer to two TRPs 210, it is to be understood that the same examples may also apply to any number of TRPs 210 (e.g., greater than two TRPs 210).

UE 115-*a* may estimate properties of a channel (e.g., a shared channel or a control channel) used for transmissions from TRPs 210-*a* and 210-*b* based on one or more reference signals transmitted over the channel. Among other examples, a channel property may include a phase change, a frequency offset, a channel synchronization, interference characteristics, or channel distortions. Channel estimation (e.g., channel property estimation) may support reception of downlink transmissions, among other examples. A QCL state may support channel estimation at UE 115-*a* by indicating relationships between different channels associated with different downlink transmissions received at different antenna ports. For example, a QCL state may indicate a relationship between respective antenna ports of a reference signal and a control channel or a shared channel (e.g., or reference signals thereof). UE 115-*a* may determine a channel property of a first antenna port (e.g., of the reference signal) and apply the channel property to a second antenna port (e.g., of the shared or control channel).

In some cases, a QCL state may indicate one or more reference signals (e.g., reference signal ports) that may be used for channel estimation for one or more antenna ports of a downlink channel. For example, the base station 105 may configure UE 115-a with a QCL state indicating that one or more antenna ports used for a downlink reference signal (e.g., a synchronization signal block (SSB) or CSI-RS) are QCLed (e.g., share one or more channel properties) with one or more antenna ports of a downlink channel such as a physical downlink shared channel (PDSCH), a physical downlink control channel (PDCCH), or CSI-RS. UE 115-a may receive QCL information from the base station 105 via a configuration (e.g., a TCI state configuration) indicating a QCL state.

QCL information may indicate a relationship between antenna ports, as well as a QCL type associated with the QCL relationship. A QCL relationship, mode, or type may indicate a relationship between two signals for one or more of a Doppler shift, Doppler spread, average delay, or one or more spatial receive parameters. For example, a first QCL relationship, mode, or type may indicate a relationship between the two signals for a Doppler shift, Doppler spread, and average delay, such as QCL-TypeA (e.g., associating channel properties including Doppler shift, Doppler spread, average delay, and delay spread). In another example, a second QCL relationship, mode, or type may indicate a relationship between the two signals for a Doppler shift and a Doppler spread, such as QCL-TypeB (e.g., associating channel properties including Doppler shift and Doppler spread). In another example, a third QCL relationship, mode, or type may indicate a relationship between the two signals for an average delay and a Doppler spread, such as QCL-TypeC (e.g., associating channel properties including Doppler shift and average delay). In another example, a fourth QCL relationship, mode, or type may indicate a relationship between the two signals for one or more spatial receive parameters, such as QCL-TypeD (e.g., associating channel properties including one or more spatial receive parameters).

In some multi-TRP deployments, two or more TRPs 210 may communicate downlink signals (e.g., reference signals or other downlink signals) to UE 115-a. For example, UE 115-a may be located on an HST 205 and may receive downlink signals from two TRPs 210. In some cases, two or more of the TRPs 210 may concurrently or simultaneously transmit a same downlink signal to UE 115-a (e.g., a joint SFN downlink signal) using a same frequency. Such downlink signals may be referred to as SFNed downlink signals or downlink signals having an SFN mode or state. Additionally or alternatively, such downlink signals may be referred to as including multiple beam configurations or multiple candidate beam configurations (e.g., one beam configuration for each TRP 210). SFNed downlink signals may represent nearly simultaneous transmissions from two or more geographically separated antennas (e.g., from two or more TRPs 210). In some cases, UE 115-a may receive SFNed downlink signals as if UE 115-a were receiving a single downlink signal.

In some cases, TRPs 210-a and 210-b may transmit independent reference signals to UE 115-a (e.g., for independent channel estimation) and UE 115-a may use the independent reference signals to perform channel estimation for antenna ports QCLed with the ports of the independent reference signals. For example, UE 115-a may use independent reference signals to receive or decode SFNed downlink signals using antenna ports QCLed with the independent reference signal antenna ports. For example, DMRS ports corresponding to an SFN transmission on a shared channel or control channel may be QCLed (e.g., associated with) one or more antenna ports of a reference signal (e.g., an SSB or CSI-RS). UE 115-a may use the information from the one or more antenna ports of the reference signal to support channel estimation for the SFN transmission.

While the techniques described herein may apply to high speed scenarios, such as HST-SFN scenarios, such techniques may also be used for any type of communications link where a UE 115 communicates with multiple TRPs 210 using an SFN mode or similar communication mode. In one example, an HST wireless network may include a set of TRPs 210 spaced along a high speed railway, where UE 115-a may communicate with a number (e.g., two) of TRPs 210 of the set of TRPs 210 (e.g., TRPs 210-a and 210-b) in the downlink and/or uplink.

Communications between UE 115-a and TRPs 210-a and 210-b may represent multi-antenna transmissions, where TRPs 210-a and 210-b may concurrently or simultaneously transmit downlink information to UE 115-a, for example, using an SFN mode. In some cases, TRPs 210-a and 210-b may be transparent to UE 115-a, such that UE 115-a may be unaware of which TRP 210 a transmission is from, or unaware that a transmission is from both TRPs 210. In some cases, SFNed transmissions from TRPs 210-a and 210-b to UE 115-a (e.g., control channel signals, shared channel signals, or both) may represent a composite channel that may be estimated using QCL state information or one or more other channel properties, among other examples.

In some cases, the SFN mode may be transparent to UE 115-a, such that UE 115-a may be unaware that a downlink signal corresponds to an SFNed signal. However, in some cases, TRPs 210-a and 210-b may be associated with different downlink channel properties (e.g., spatial or other transmission properties, such as different QCL states), such that if UE 115-a is unaware of the SFN mode, UE 115-a may be unable to decode or receive the respective signals from TRPs 210-a and 210-b using a corresponding composite channel. For example, if UE 115-a is unaware of the SFN mode, UE 115-a may expect to receive one set of reference signals for the channel instead of two sets of reference signals for the composite channel (e.g., one for each TRP 210). If UE 115-a is unaware of the SFN mode, UE 115-a may process communications according to the one set of reference signals, which may result in communication errors or reduced communication quality, speed, or throughput. Accordingly, the present disclosure provides techniques for indicating an SFN mode and composite channel reference signals to a UE 115 (e.g., UE 115-a).

For example, the base station 105 may transmit a configuration 215 (e.g., an RRC configuration) for one or more of a BWP, CORESET, or search space for a control channel transmission 225. The configuration 215 may be transmitted via TRP 210-a, TRP 210-b, another TRP 210, or any combination thereof. The configuration 215 may indicate whether control channel transmissions 225 associated with the configured BWP, CORESET, or search space are associated with an SFN mode, where the indication of the SFN mode may be explicit or implicit. For example, an SFN mode may be explicitly indicated as enabled or disabled in the configuration 215 (e.g., in a CORESET configuration). The configuration 215 may also configure a number of TCI states for the BWP, CORESET, or search space. In some cases, the configuration 215 may support configuring up to 64 TCI states, while in some cases, the configuration 215 may support configuring more than 64 TCI states. In some cases, two of the configured TCI states, or two other TCI states, may be used to respectively indicate QCL information for the two TRPs 210. For example, control signaling 220 (e.g., a MAC CE) from the base station 105 may indicate or activate a TCI state for each TRP 210 communicating with UE 115-a (e.g., TRPs 210-a and 210-b). The control signaling 220 may be transmitted via TRP 210-a, TRP 210-b, another TRP 210, or any combination thereof.

In some cases, the configuration 215 may implicitly indicate the SFN mode for the control channel transmission 225. For example, the configuration 215 may configure a TCI state for the control channel transmissions 225 (e.g., for an associated CORESET) such that the TCI state indicates two or more types of reference signals for a QCL type or state. If UE 115-a receives a configuration 215 that indicates multiple reference signals for a TCI state or for a QCL type, UE 115-a may determine that an associated control channel transmission 225 is SFNed.

In a first example, a QCL type of the TCI state may be associated with multiple (e.g., two or more) instances of QCL information, where each instance of QCL information may be associated with a reference signal. In some cases, each instance of QCL information may also be associated with a TRP 210 of the multiple TRPs 210 serving UE 115-a (e.g., TRP 210-a or 210-b). In a second example, a QCL type of the TCI state may be associated with one instance of QCL information, and the instance of QCL information may be associated with two or more reference signals. In some cases, each reference signal may be associated with a TRP 210 of the multiple TRPs 210 serving UE 115-a (e.g., TRP 210-a or 210-b).

In some cases, the configuration may implicitly indicate the SFN mode for the control channel transmission 225 by indicating an SFN mode for a shared channel transmission to UE 115-a. The base station 105 may configure the UE 115-a to use a same configuration (e.g., same TCI states, QCL states, or associated reference signals) for the control channel transmission 225 as for the shared channel transmission.

In any of the examples described herein, UE 115-a may determine that the SFN mode is enabled for the control channel transmission 225, for example, based on an implicit or explicit indication in the configuration 215. UE 115-a may receive one or more reference signals from each TRP 210 and, based on the SFN indication, may determine that each of the one or more reference signals is associated with the control channel transmission 225 (e.g., via a QCL state or relationship). UE 115-a may use information from the one or more reference signals (e.g., channel estimation information) to receive the control channel transmission 225 (e.g., a control signal on the control channel).

Figure 3A:
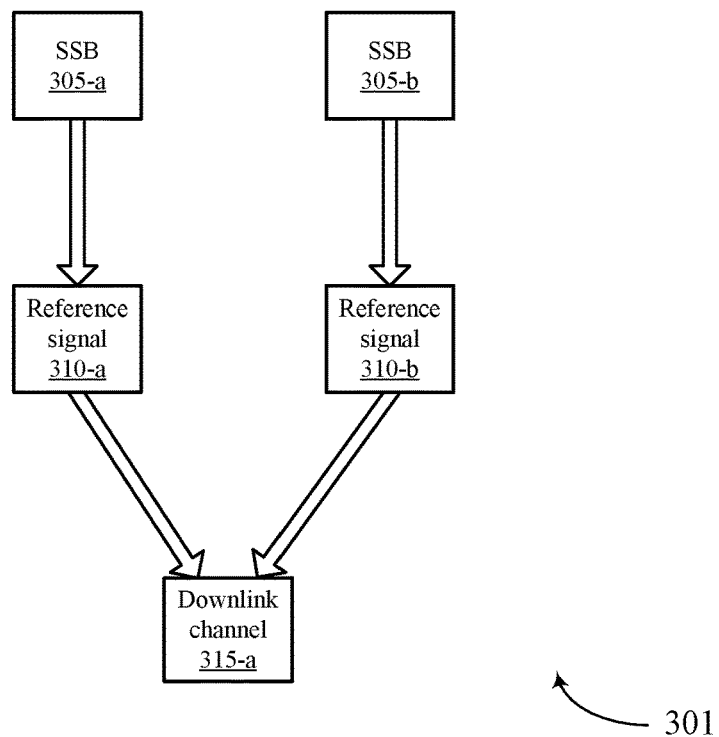
FIGS. 3A and 3B illustrate respective examples of signaling schemes in accordance with aspects of the present disclosure.
Figure 3B:
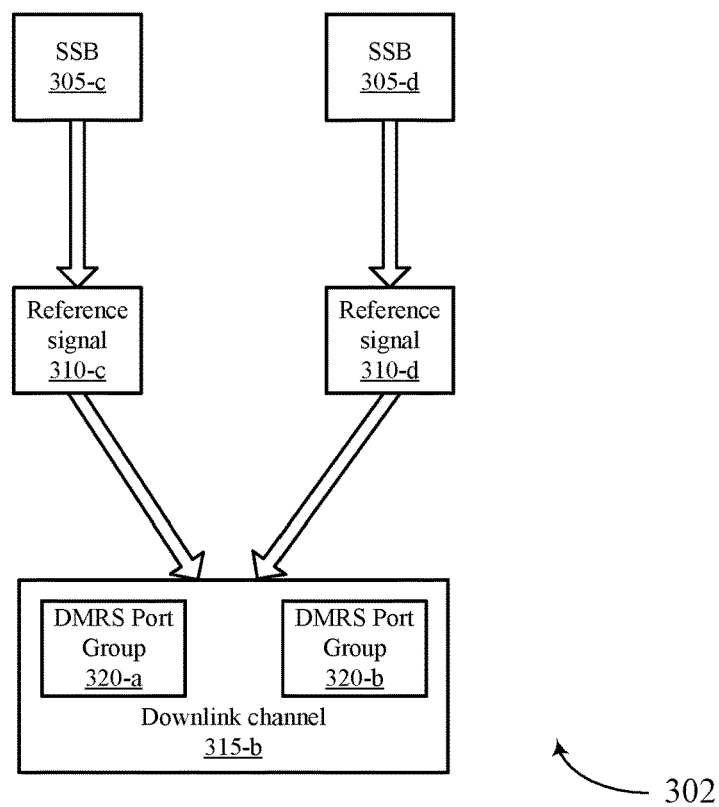

FIGS. 3A and 3B illustrate respective examples of signaling schemes 301 and 302 in accordance with aspects of the present disclosure. In some examples, signaling schemes 301 and 302 may implement aspects of wireless communications system 100 or 200. For example, signaling schemes 301 and 302 may be implemented by a UE 115 (not shown) and a base station 105 (not shown), which may be examples of a UE 115 and base station 105 described with reference to FIGS. 1 and 2. Signaling schemes 301 and 302 may also be implemented by two or more TRPs, where UE 115-a may communicate with the base station 105 via the two or more TRPs. For example, signaling schemes 301 and 302 may be implemented by two TRPs (not shown), which may correspond to the base station 105. While the examples described herein refer to two TRPs, it is to be understood that the same examples may also apply to any number of TRPs (e.g., greater than two TRPs).

In some cases, references signals 310 (e.g., tracking reference signals (TRS), CSI-RS, or CRS) and SSBs 305 may be transmitted separately or independently from each TRP. In the example illustrated by FIG. 3A, a first TRP may transmit an SSB 305-a to the UE 115 and a second TRP may independently transmit an SSB 305-b to the UE 115. Similarly, the first TRP may transmit a reference signal 310-a to the UE 115 and the second TRP may independently transmit a reference signal 310-b to the UE 115. In the example illustrated by FIG. 3B, the first TRP may transmit an SSB 305-c to the UE 115 and a second TRP may independently transmit an SSB 305-d to the UE 115. Similarly, the first TRP may transmit a reference signal 310-c to the UE 115 and the second TRP may independently transmit a reference signal 310-d to the UE 115. The UE 115 may be configured with multiple QCL states (e.g., reference signal relationships), where each QCL state may be associated with a reference signal 310 of one of the TRPs. For example, the UE 115 may be configured with multiple TCI states (e.g., one TCI state for each TRP), where each TCI state may include QCL state information for a reference signal 310 of one of the TRPs.

As described with reference to FIG. 2, the UE 115 may receive a configuration indicating that a downlink channel transmission 315 (e.g., a control channel transmission) is associated with an SFN mode. The SFN mode may, for example, represent a state in which the UE receives a transmission from two or more TRPs, where each TRP may be associated with a different reference signal QCL relationship for the downlink channel transmission 315. In such configurations, a doppler profile of each TRP, among other channel characteristics, may be estimated independently by the UE 115. Because channel characteristics may be estimated independently for each TRP, the downlink channel transmission 315 may support increased channel estimation performance, for example, compared to configurations where the UE 115 may be unaware of the SFN mode. For example, the DMRS of the downlink channel transmission 315 may be associated with multiple CSI-RS (e.g., one or more CSI-RS for each TRP), which may increase channel estimation performance, for example, because transmissions from each TRP may be associated with different channel characteristics and different corresponding reference signal characteristics.

Signaling scheme 301, in some examples, may represent a scheme associating a downlink channel transmission 315-a (e.g., a control channel transmission) with reference signals 310-a and 310-b from two respective TRPs, where one DMRS port of downlink channel transmission 315-a may share a QCL relationship (e.g., may be QCLed) with reference signals 310-a and 310-b. The DMRS of downlink channel transmission 315-a may be dependent based on the QCL relationship with both reference signal 310-a and 310-b. Signaling scheme 301 may thus support composite channel estimation using one DMRS port, which may reduce DMRS overhead. In one example, each DMRS port of downlink channel transmission 315-a may be associated with two TCI states (e.g., one TCI state for each TRP), and each TCI state may include or indicate corresponding QCL state information.

Signaling scheme 302, in some examples, may represent a scheme associating a downlink channel transmission 315-b (e.g., a control channel transmission) with reference signals 310-c and 310-d from two respective TRPs, where multiple DMRS ports of downlink channel transmission 315-*b* may share a QCL relationship (e.g., may be QCLed) with reference signal 310-*a* or 310-*b*. The DMRS of downlink channel transmission 315-*a* may be independent based on this QCL relationship. Signaling scheme 302 may thus support composite channel estimation using multiple DMRS ports. In one example, reference signal 310-*c* may be associated with a first group of DMRS ports, DMRS port group 320-*a*, and reference signal 310-*d* may be associated with a second group of DMRS ports, DMRS port group 320-*b*. Each data layer of the downlink channel transmission 315-*b* may be associated with two TCI states (e.g., one TCI state for each TRP) via one port in DMRS port group 320-*a* and one port in DMRS port group 320-*b*.

In some cases, the reference signals 310 represented by signaling scheme 301 or 302 may be associated with one TCI state instead of two TCI states. For example, as described with reference to FIG. 2, one TCI state may indicate a relationship between a QCL type and two or more reference signals 310. For example, the TCI state may indicate a relationship between a QCL type and reference signals 310-*a* and 310-*b* or between a QCL type and reference signals 310-*c* and 310-*d*.

In a first example of one TCI state, the TCI state may indicate the QCL relationship by supporting multiple instances of QCL information for one QCL type. For example, the TCI state may indicate a TCI state identifier (ID), a first QCL type, and a second, optional QCL type. The first QCL type and the second QCL type may each be configured to be associated with multiple respective instances of QCL information, for example, up to a number of TRPs communicating with the UE 115 via an SFN mode. Each instance of QCL information may be associated with a reference signal 310 (e.g., SSB or CSI-RS), such as via a reference signal resource ID (e.g., a CSI-RS resource ID) or an index (e.g., an SSB index). Each instance of QCL information may also indicate whether the QCL state is associated with a QCL type (e.g., QCL Type-A, QCL Type-B, QCL Type-C, or QCL Type-D). In some cases, an instance of QCL information may indicate a serving cell index or a BWP ID associated with the QCL information.

In a second example of one TCI state, the TCI state may indicate the relationship between the QCL type and the multiple reference signals 310 by supporting multiple reference signals 310 for the QCL information of the QCL type. The TCI state may indicate a TCI state identifier (ID), a first QCL type, and a second, optional QCL type, where each QCL type may be associated with respective QCL information (e.g., one instance of QCL information). The QCL information may be associated with multiple reference signals 310 (e.g., SSB or CSI-RS), for example, up to a number of TRPs communicating with the UE 115 via an SFN mode. Each reference signal 310 may be indicated via a respective reference signal resource ID (e.g., CSI-RS resource ID) or an index (e.g., SSB index). The QCL information may also indicate whether the QCL state is associated with QCL Type-A, QCL Type-B, QCL Type-C, or QCL Type-D. In some cases, the QCL information may indicate a serving cell index or a BWP ID associated with the QCL information.

In any of the examples described herein, the UE 115 may receive one or more reference signals 310 from each TRP and, based on an SFN indication, may determine that each of the one or more reference signals 310 is associated with the downlink channel transmission 315 (e.g., via a QCL state or relationship). The UE 115 may use information from the one or more reference signals 310 (e.g., channel estimation information) to receive the downlink channel transmission 315 (e.g., a control signal on the control channel).

Figure 4:
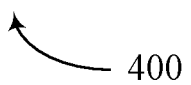
FIG. 4 illustrates an example of control information in accordance with aspects of the present disclosure.

FIG. 4 illustrates an example of control information 400 in accordance with aspects of the present disclosure. In some examples, control information 400 may implement aspects of wireless communications system 100 or 200. For example, control information 400 may be used by a UE 115 (not shown) and a base station 105 (not shown), which may be examples of a UE 115 and a base station 105 described with reference to FIGS. 1-3. Control information 400 may also be used or transmitted by two or more TRPs, where the UE 115 may communicate with the base station 105 via the two or more TRPs. For example, control information 400 may be used by two TRPs (not shown), which may correspond to the base station 105. While the examples described herein refer to two TRPs, it is to be understood that the same examples may also apply to any number of TRPs (e.g., greater than two TRPs).

As described with reference to FIG. 2, the two TRPs may transmit one or more downlink signals (e.g., a downlink control signal on a control channel) using an SFN mode. The SFN mode may, in some cases, be explicitly or implicitly indicated via a configuration transmitted to the UE 115 by the base station 105. The configuration may also configure a number of TCI states for the UE 115 (e.g., for the control channel), where two of the configured TCI states, or two other TCI states, may be used to respectively indicate QCL information for each of the two TRPs. For example, control signaling (e.g., a MAC CE) from the base station 105 may indicate or activate a TCI state for each TRP communicating with the UE 115. The control signaling may include an example of control information 400.

For example, the control signaling may include an indication of a serving cell ID 405 associated with the control channel, as well as one or more instances of a CORESET ID 410 associated with the control channel. The control signaling may also activate multiple TCI states, for example, one TCI state for each TRP communicating with the UE 115 in an SFN mode for the control channel. In one example, the control signaling may indicate a TCI state ID 415-*a* for a first TRP communicating with the UE 115 and a TCI state ID 415-*b* for a second TRP communicating with the UE 115. In some cases, each ID in the control signaling may be represented by a number of bits, where each type of ID may correspond to a different number of bits. In one example, the serving cell ID 405 may be represented by five bits, the CORESET ID 410 may be represented by four bits, and each TCI state ID 415 may be respectively represented by seven bits. In some cases, the control signaling may also indicate a TRP associated with each respective TCI state ID 415, for example, using the bits associated with the TCI state ID 415 or using other bits.

In a first example, the configuration from the base station may configure two TCI states for the UE 115, and the UE 115 may determine that each of the two TCI states corresponds to a respective TRP and may activate or use the two TCI states for SFN communications. For example, the control signaling may indicate the TCI state IDs 415 for each of the respective TCI states. Additionally or alternatively, the UE 115 may determine that the number of configured TCI states is equal to the number of TRPs communicating with the UE 115 in the SFN mode, based on which the UE 115 may further determine that each of the two TCI states corresponds to a respective TRP (e.g., where the association between the TCI state and the TRP may be indicated via the control signaling).

In a second example, the configuration may configure one TCI state for the UE 115. In some cases, the control signaling may indicate (e.g., activate) the configured TCI state via a first TCI state ID 415 (e.g., TCI state ID 415-*a*) and may provide or activate a second TCI state via a second TCI state ID 415 (e.g., TCI state ID 415-*b*). In some cases, the second TCI state may not be configured by the configuration from the base station 105. In some cases, the control signaling may indicate or activate two TCI states, via the TCI state IDs 415, where the two activated TCI states may not include the configured TCI state. The UE 115 may activate or use the two indicated TCI states 415 for the SFN communications as described herein.

In a third example, the configuration may configure more than two TCI states for the UE 115, and the control signaling may indicate or activate two of the configured TCI states (e.g., via the TCI state IDs 415). If the control signaling fails to indicate or activate two of the configured TCI states (e.g., activates one of the TCI states), the control signaling may trigger an error case at the UE 115, and in some cases, the UE 115 may report the error case to the base station 105. If the control signaling indicates or activates two of the configured TCI states, the UE 115 may activate or use the two indicated TCI states 415 for the SFN communications as described herein.

Figure 5:
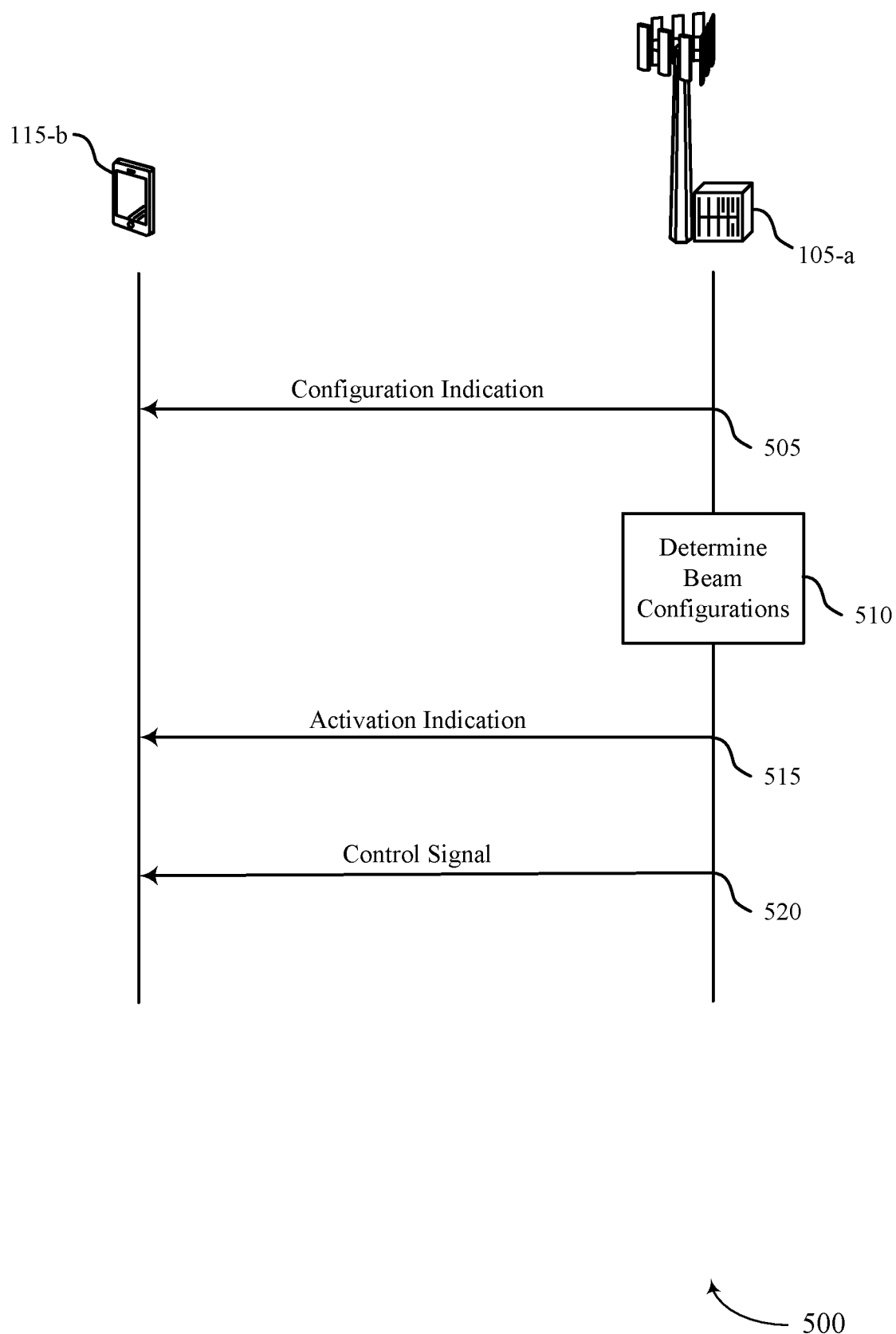
FIG. 5 illustrates an example of a process flow in accordance with aspects of the present disclosure.

FIG. 5 illustrates an example of a process flow 500 in accordance with aspects of the present disclosure. In some examples, process flow 500 may implement aspects of wireless communications systems 100 or 200. Process flow 500 may include or be implemented by a base station 105-*a* and a UE 115-*b*, which may be examples of a base station 105 and UE 115 described with reference to FIGS. 1-4. Process flow 500 may illustrate an example where UE 115-*b* may be notified of an SFN mode for a downlink signal and may activate two or more beam configurations for reception of the downlink signal (e.g., a control signal) from base station 105-*a*. As described herein, a control signal may be transmitted to UE 115-*b* via two or more TRPs (e.g., using an SFN state). In some cases, base station 105-*a* may be associated with each of the two or more TRPs, or in some cases, base station 105-*a* may be associated with at least one of the two or more TRPs. In some cases, as described herein, UE 115-*b* may be located on an HST.

At 505, base station 105-*a* may transmit, to UE 115-*b*, an indication of multiple candidate beam configurations (e.g., an indication of an SFN mode) for a control channel, where the control channel may be associated with control signal transmissions via the two or more TRPs. In some examples, the indication of the multiple candidate beam configurations may include or be included in an RRC message or an RRC configuration. For example, an RRC configuration may include an explicit indication of an SFN mode for control channel transmissions via the two or more TRPs (e.g., via a CORESET configuration).

In some cases, the RRC configuration may exclude an explicit indication of the SFN mode and may include an implicit indication of the SFN mode, for example, via an indication of multiple reference signals associated with a TCI state indicated in the RRC configuration (e.g., indicated via QCL information of the TCI state). In some cases, a QCL type of the TCI state may be associated with multiple instances of QCL information (e.g., one for each of the two or more TRPs or multiple candidate beam configurations), and each instance of QCL information may be associated with a reference signal. In some cases, QCL information of a QCL type of the TCI state may be associated with multiple reference signals (e.g., one for each of the two or more TRPs or multiple candidate beam configurations).

At 510, base station 105-*a* may determine, based on the multiple candidate beam configurations, two or more beam configurations to activate for the control channel. For example, base station 105-*a* may identify the two or more TRPs associated with the control channel transmissions to UE 115-*b* (e.g., the control signal transmission) and may activate the two or more beam configurations based on identifying the two or more TRPs. In some cases, each beam configuration of the two or more activated beam configurations may correspond to a TRP of the two or more TRPs. In some cases, determining a beam configuration that corresponds to a TRP of the two or more TRPs may be based on one or more channel or spatial characteristics associated with the TRP.

At 515, base station 105-*a* may transmit, to UE 115-*b*, an indication to activate, for the control channel, the two or more beam configurations. In some examples, the indication to activate the two or more beam configurations may be received via control signaling, such as via a MAC CE. As described herein with reference to FIG. 4, a first example of the indication to activate the two or more beam configurations may include and indication for UE 115-*b* to activate each of the multiple candidate beam configurations. For example, the multiple candidate beam configurations may represent multiple TCI states (e.g., two TCI states) and base station 105-*a* may transmit an indication to activate the multiple TCI states. In a second example, the indication to activate the two or more beam configurations may indicate for UE 115-*b* to activate one of the multiple candidate beam configurations and one or more other beam configurations. For example, the multiple candidate beam configurations may represent multiple TCI states (e.g., two TCI states) and base station 105-*a* may transmit an indication to activate one of the multiple TCI states and one additional TCI state.

In a third example, the indication to activate the two or more beam configurations may indicate for UE 115-*b* to activate two or more other beam configurations different from the multiple candidate beam configurations. For example, the multiple candidate beam configurations may represent multiple TCI states (e.g., two TCI states) and base station 105-*a* may transmit an indication to activate two or more TCI states not included in the multiple TCI states. In a fourth example, the indication to activate the two or more beam configurations may indicate for UE 115-*b* to activate two or more other configurations of the multiple candidate beam configurations. For example, the multiple candidate beam configurations may represent multiple TCI states (e.g., two TCI states) and base station 105-*a* may transmit an indication to activate two or more TCI states of the multiple TCI states.

At 520, base station 105-*a* may transmit, to UE 115-*b* and based on the two or more activated beam configurations, the control signal on the control channel, and UE 115-*b* may receive the control signal on the control channel according to the two or more activated beam configurations. In some cases, base station 105-*a* may transmit the control signal via the two or more TRPs. For example, base station 105-*a* may transmit the control signal via a PDCCH and based on the two or more activated beam configurations associated with the two or more TRPs. In some cases, base station 105-*a* may transmit the control signal via a TRP of the two or more TRPs based on a beam configuration (e.g., TCI state or QCL state) associated with the TRP and UE 115-*b* may receive the control signal from the TRP using the beam configuration (e.g., TCI state or QCL state) associated with the TRP (e.g., associated with one or more reference signals of the TRP).

Figure 6:
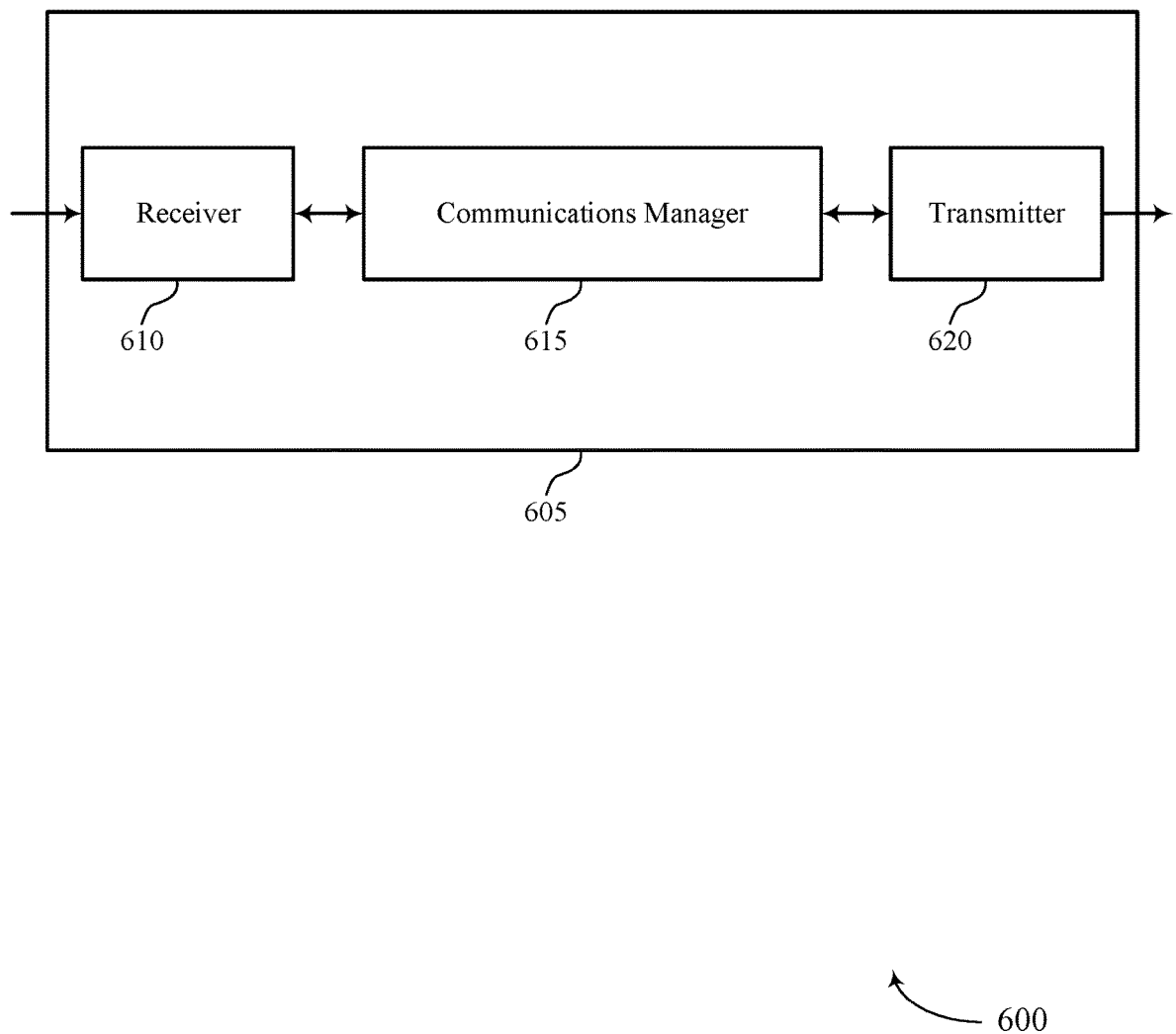
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to beam configuration indication for a downlink control channel, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, an indication of a set of candidate beam configurations for a control channel, the control channel associated with transmissions via two or more TRPs, receive an indication to activate, for the control channel, two or more beam configurations based on the set of candidate beam configurations, and receive, according to the two or more activated beam configurations, a control signal on the control channel. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615 as described herein, among other examples, may be implemented to realize one or more potential advantages. For example, communications manager 615 may increase channel quality and throughput and decrease interference at a wireless device (e.g., a UE 115) by supporting identification of reference signals for multiple TRPs in an SFN mode. The identification of the SFN mode may reduce delays, interference, and power consumption (or any combination thereof) compared to other systems and techniques, for example, that do not support identification of an SFN mode for transmissions involving multiple TRPs. Accordingly, communications manager 615 may save power and increase battery life at a wireless device (e.g., a UE 115) by strategically increasing a quality of communications at a wireless device (e.g., a UE 115).

Figure 7:
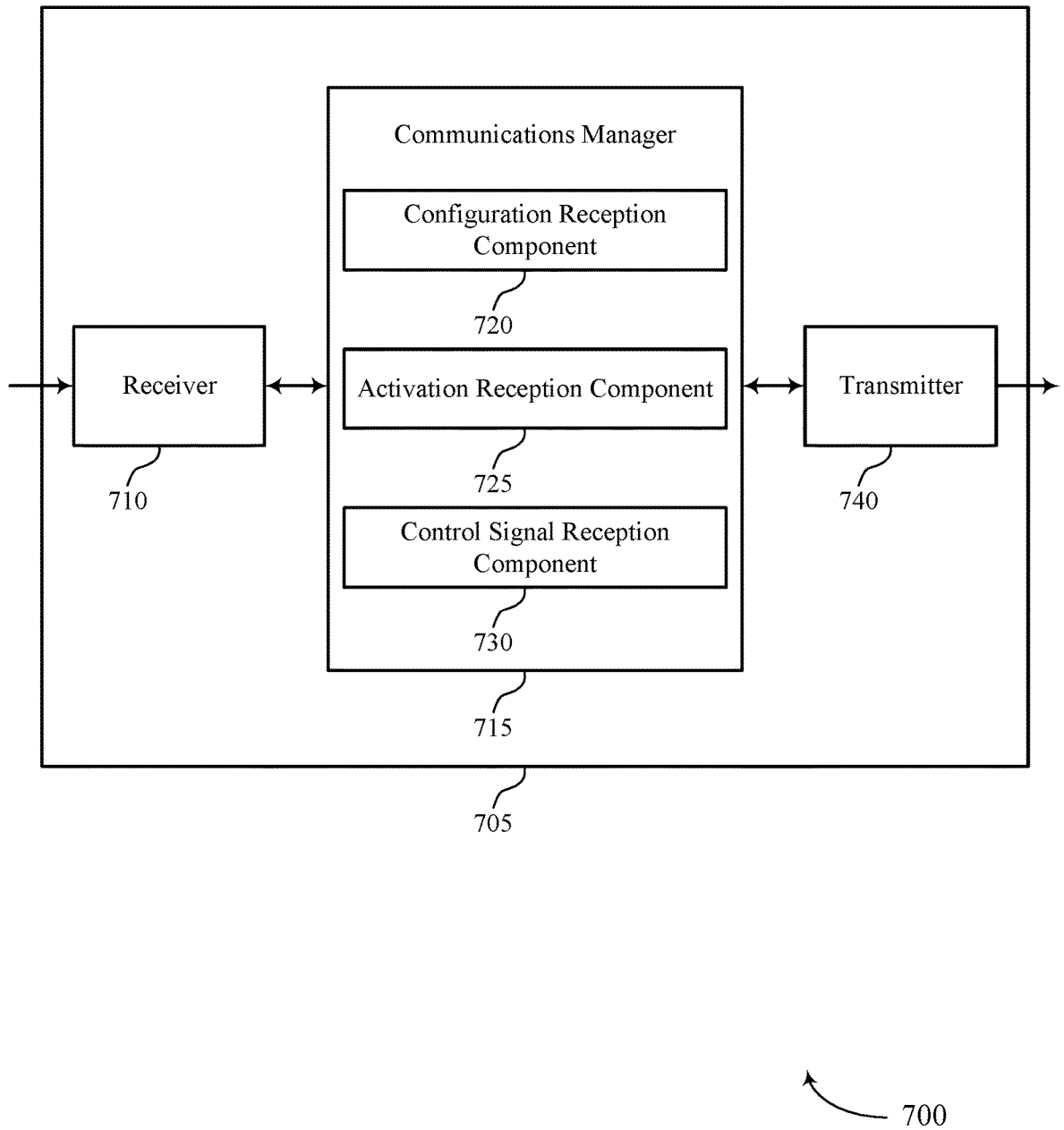

FIG. 7 shows a block diagram 700 of a device 705 in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to beam configuration indication for a downlink control channel, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration reception component 720, an activation reception component 725, and a control signal reception component 730. The communications manager 715 may be an example of aspects of the communications manager 910 described herein.

The configuration reception component 720 may receive, from a base station, an indication of a set of candidate beam configurations for a control channel, the control channel associated with transmissions via two or more TRPs.

The activation reception component 725 may receive an indication to activate, for the control channel, two or more beam configurations based on the set of candidate beam configurations.

The control signal reception component 730 may receive, according to the two or more activated beam configurations, a control signal on the control channel.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a wireless device (e.g., controlling the receiver 710, the transmitter 735, or the transceiver 920 as described with reference to FIG. 9) may increase communication reliability and accuracy by decreasing interference, and increasing communication quality and available power. The reduced interference may increase communication quality and throughput, which may reduce power consumption (e.g., via implementation of system components described with reference to FIG. 8) compared to other systems and techniques, for example, that do not support indication of an SFN mode, which may increase interference and power consumption. Further, the processor of the UE 115 may identify one or more aspects of an SFN mode indication and of multiple reference signals associated with the SFN mode to perform the processes described herein. The processor of the wireless device may use the indication of the SFN mode and the multiple reference signals to perform one or more actions that may result in lower interference and power consumption, as well as save power and increase battery life at the wireless device (e.g., by strategically increasing communication quality and throughput), among other benefits.

Figure 8:
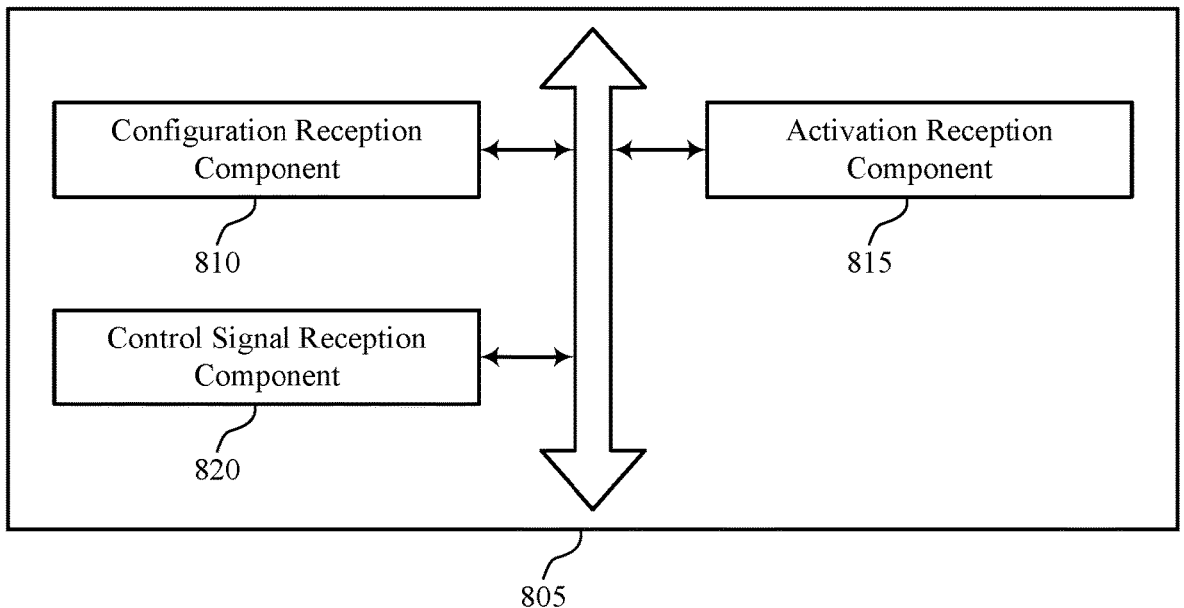
FIG. 8 shows a block diagram of a communications manager in accordance with aspects of the present disclosure.

FIG. 8 shows a block diagram 800 of a communications manager 805 in accordance with aspects of the present disclosure. The communications manager 805 may be an example of aspects of a communications manager 615, a communications manager 715, or a communications manager 910 described herein. The communications manager 805 may include a configuration reception component 810, an activation reception component 815, and a control signal reception component 820. Each of these modules may communicate, directly or indirectly, with one another (e.g., via one or more buses).

The configuration reception component 810 may receive, from a base station, an indication of a set of candidate beam configurations for a control channel, the control channel associated with transmissions via two or more TRPs. In some examples, the configuration reception component 810 may receive signaling configuring the control channel for an SFN mode.

In some examples, the configuration reception component 810 may receive signaling configuring two or more downlink reference signals for a QCL type of a TCI state for the control channel. In some examples, the configuration reception component 810 may receive, via the signaling, an indication of two or more instances of QCL information for the QCL type, each instance of QCL information associated with a respective downlink reference signal of the two or more downlink reference signals. In some examples, the configuration reception component 810 may receive, via the signaling, an indication that an instance of QCL information for the QCL type is associated with the two or more downlink reference signals.

In some examples, the configuration reception component 810 may receive an indication of a second set of candidate beam configurations for a shared channel associated with the control channel, the second set of beam configurations including the set of candidate beam configurations. In some examples, the configuration reception component 810 may receive a CORESET configuration indicating the set of candidate beam configurations for the control channel.

In some cases, the signaling configuring the control channel for the SFN mode configures the SFN mode for one or more of a search space associated with the control channel or a BWP associated with the control channel. In some cases, the CORESET configuration indicates that more than 64 TCI states are configurable for the control channel. In some cases, the set of candidate beam configurations is associated with an SFN state. In some cases, the indication of the set of candidate beam configurations is received in RRC signaling.

The activation reception component 815 may receive an indication to activate, for the control channel, two or more beam configurations based on the set of candidate beam configurations. In some examples, the activation reception component 815 may receive an indication to activate each of the set of candidate beam configurations for the control channel, where the set of candidate beam configurations includes the two or more activated beam configurations. In some examples, the activation reception component 815 may receive an indication to activate one of the set of candidate beam configurations for the control channel and one or more other beam configurations.

In some examples, the activation reception component 815 may receive an indication to activate two or more of the set of candidate beam configurations for the control channel, the two or more of the set of candidate beam configurations including the two or more activated beam configurations. In some examples, the activation reception component 815 may receive an indication to activate two or more other beam configurations different from any of the set of candidate beam configurations for the control channel, the two or more other beam configurations including the two or more activated beam configurations. In some cases, the indication to activate the two or more beam configurations is received in a MAC CE.

The control signal reception component 820 may receive, according to the two or more activated beam configurations, a control signal on the control channel.

Figure 9:
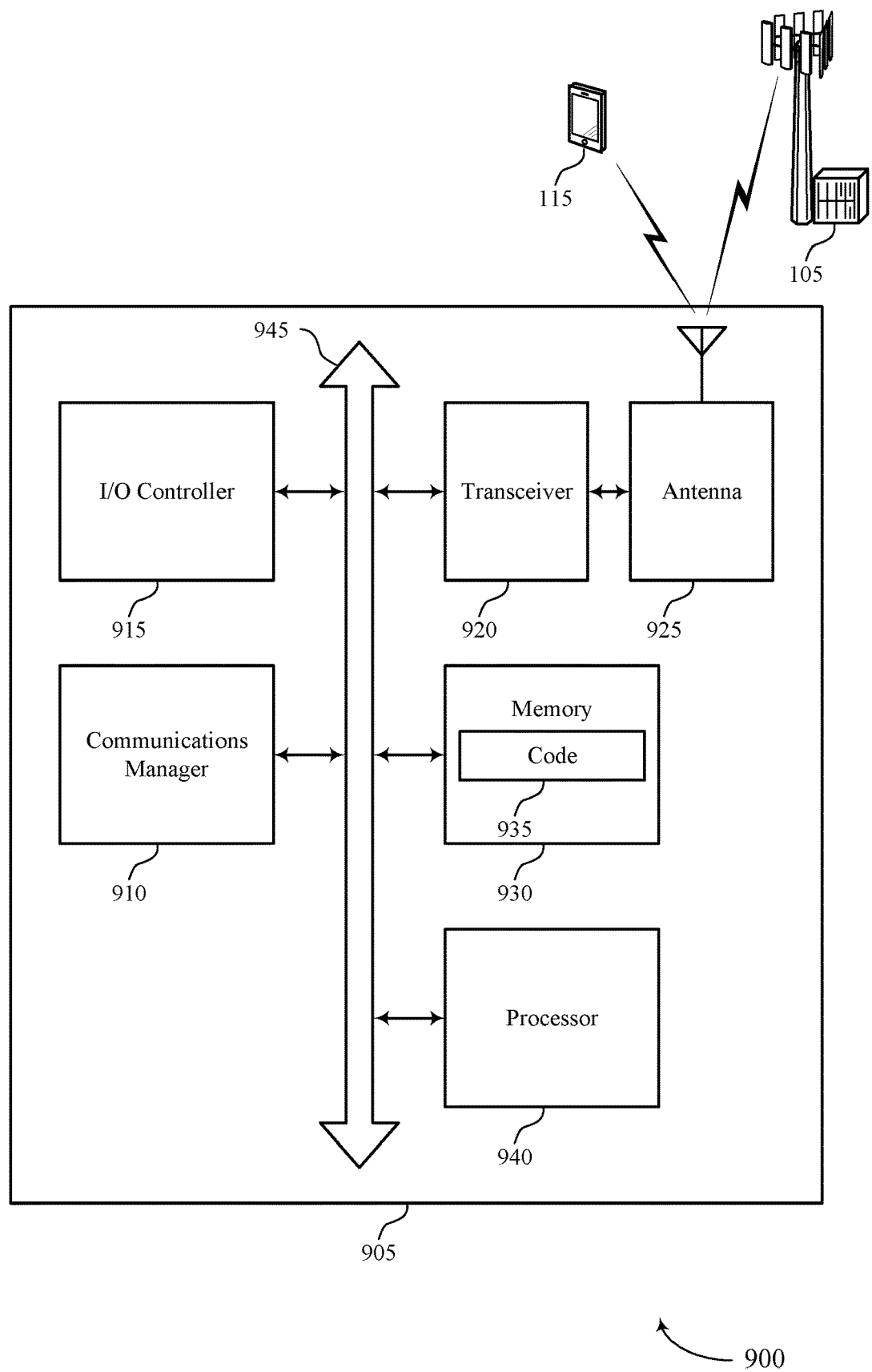
FIG. 9 shows a diagram of a system including a device in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, an indication of a set of candidate beam configurations for a control channel, the control channel associated with transmissions via two or more TRPs, receive an indication to activate, for the control channel, two or more beam configurations based on the set of candidate beam configurations, and receive, according to the two or more activated beam configurations, a control signal on the control channel.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting beam configuration indication for a downlink control channel).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
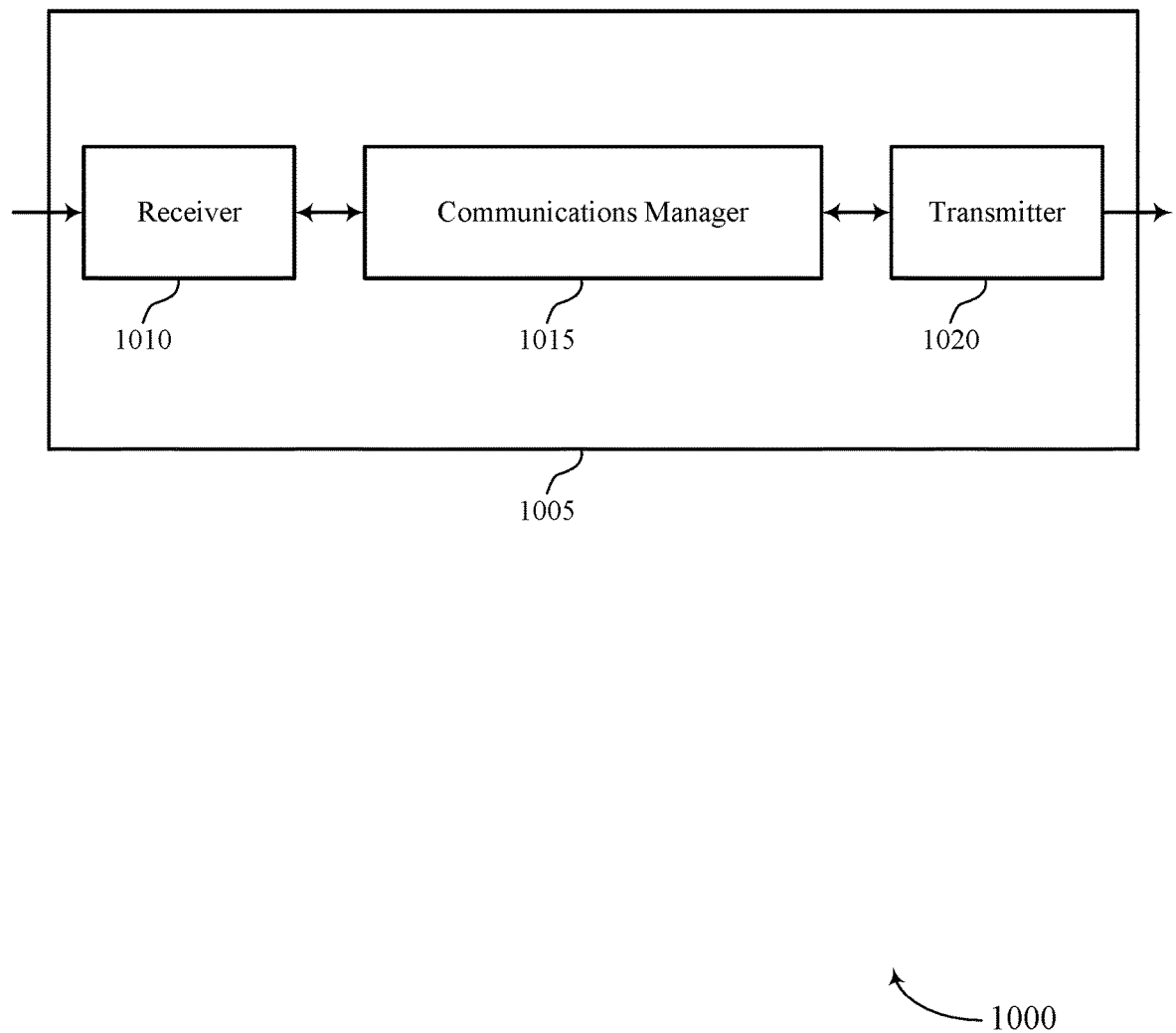
FIGS. 10 and 11 show block diagrams of devices in accordance with aspects of the present disclosure.

FIG. 10 shows a block diagram 1000 of a device 1005 in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to beam configuration indication for a downlink control channel, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, an indication of a set of candidate beam configurations for a control channel, the control channel associated with transmissions from two or more TRPs, determine, based on the set of candidate beam configurations, two or more beam configurations to activate for the control channel, transmit an indication to activate, for the control channel, the two or more beam configurations, and transmit, via the two or more TRPs based on the two or more activated beam configurations, a control signal on the control channel. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
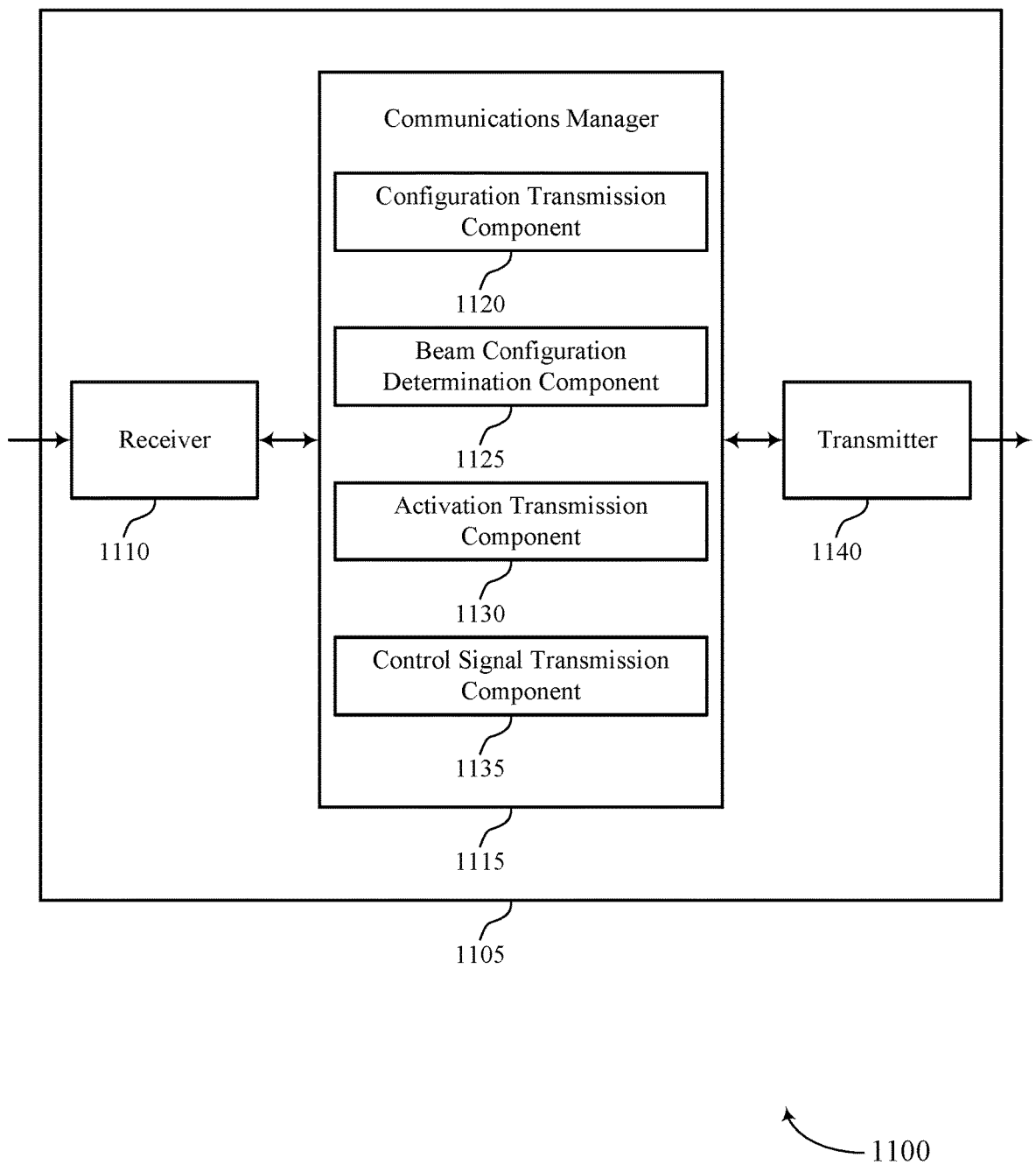

FIG. 11 shows a block diagram 1100 of a device 1105 in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to beam configuration indication for a downlink control channel, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration transmission component 1120, a beam configuration determination component 1125, an activation transmission component 1130, and a control signal transmission component 1135. The communications manager 1115 may be an example of aspects of the communications manager 1310 described herein.

The configuration transmission component 1120 may transmit, to a UE, an indication of a set of candidate beam configurations for a control channel, the control channel associated with transmissions from two or more TRPs. The beam configuration determination component 1125 may determine, based on the set of candidate beam configurations, two or more beam configurations to activate for the control channel.

The activation transmission component 1130 may transmit an indication to activate, for the control channel, the two or more beam configurations. The control signal transmission component 1135 may transmit, via the two or more TRPs based on the two or more activated beam configurations, a control signal on the control channel.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
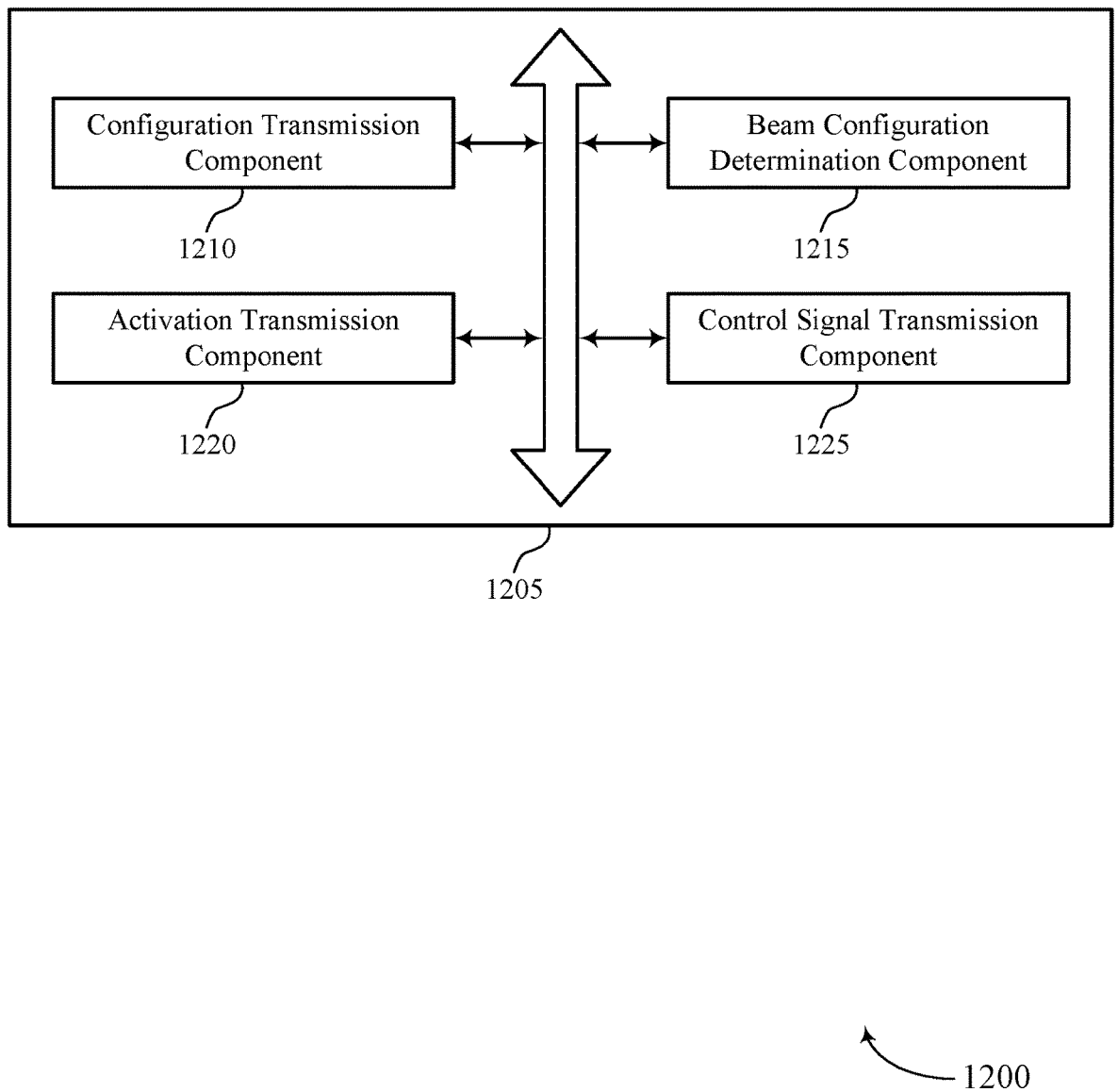
FIG. 12 shows a block diagram of a communications manager in accordance with aspects of the present disclosure.

FIG. 12 shows a block diagram 1200 of a communications manager 1205 in accordance with aspects of the present disclosure. The communications manager 1205 may be an example of aspects of a communications manager 1015, a communications manager 1115, or a communications manager 1310 described herein. The communications manager 1205 may include a configuration transmission component 1210, a beam configuration determination component 1215, an activation transmission component 1220, and a control signal transmission component 1225. Each of these modules may communicate, directly or indirectly, with one another (e.g., via one or more buses).

The configuration transmission component 1210 may transmit, to a UE, an indication of a set of candidate beam configurations for a control channel, the control channel associated with transmissions from two or more TRPs. In some examples, the configuration transmission component 1210 may transmit signaling configuring the control channel for an SFN mode.

In some examples, the configuration transmission component 1210 may transmit signaling configuring two or more downlink reference signals for a QCL type of a TCI state for the control channel. In some examples, the configuration transmission component 1210 may transmit, via the signaling, an indication of two or more instances of QCL information for the QCL type, each instance of QCL information associated with a respective downlink reference signal of the two or more downlink reference signals. In some examples, the configuration transmission component 1210 may transmit, via the signaling, an indication that an instance of QCL information for the QCL type is associated with the two or more downlink reference signals.

In some examples, the configuration transmission component 1210 may transmit an indication of a second set of candidate beam configurations for a shared channel associated with the control channel, the second set of beam configurations including the set of candidate beam configurations. In some examples, the configuration transmission component 1210 may transmit a CORESET configuration indicating the set of candidate beam configurations for the control channel.

In some cases, the signaling configuring the control channel for the SFN mode configures the SFN mode for one or more of a search space associated with the control channel or a BWP associated with the control channel. In some cases, the CORESET configuration indicates that more than sixty-four TCI states are configurable for the control channel. In some cases, the set of candidate beam configurations is associated with an SFN state. In some cases, the indication of the set of candidate beam configurations is transmitted in RRC signaling.

The beam configuration determination component 1215 may determine, based on the set of candidate beam configurations, two or more beam configurations to activate for the control channel.

The activation transmission component 1220 may transmit an indication to activate, for the control channel, the two or more beam configurations. In some examples, the activation transmission component 1220 may transmit an indication to activate each of the set of candidate beam configurations for the control channel, where the set of candidate beam configurations includes the two or more activated beam configurations. In some examples, the activation transmission component 1220 may transmit an indication to activate one of the set of candidate beam configurations for the control channel and one or more other beam configurations.

In some examples, the activation transmission component 1220 may transmit an indication to activate two or more of the set of candidate beam configurations for the control channel, the two or more of the set of candidate beam configurations including the two or more activated beam configurations. In some examples, the activation transmission component 1220 may transmit an indication to activate two or more other beam configurations different from any of the set of candidate beam configurations for the control channel, the two or more other beam configurations including the two or more activated beam configurations. In some cases, the indication to activate the two or more beam configurations is transmitted in a MAC CE.

The control signal transmission component 1225 may transmit, via the two or more TRPs based on the two or more activated beam configurations, a control signal on the control channel.

Figure 13:
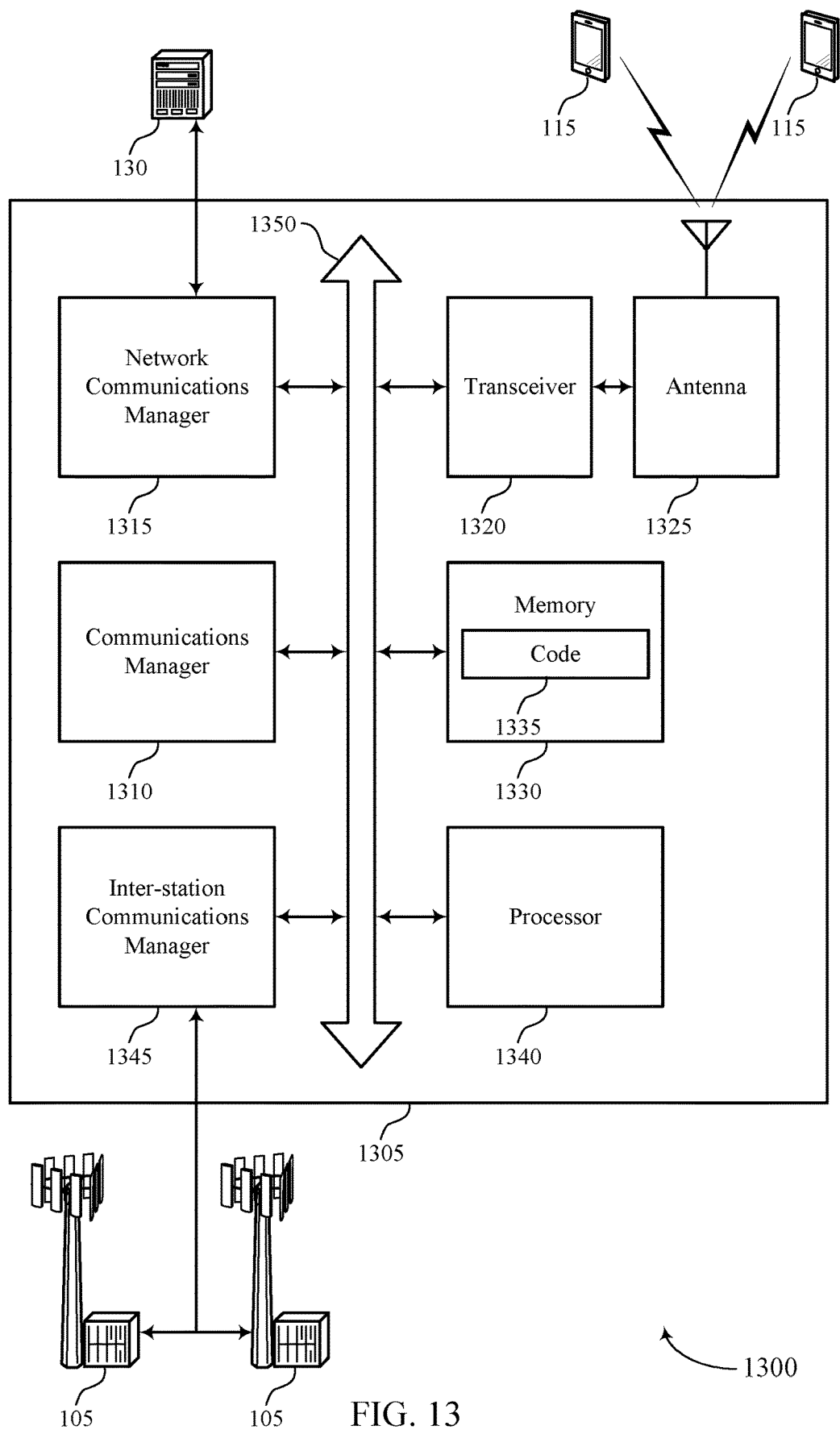
FIG. 13 shows a diagram of a system including a device in accordance with aspects of the present disclosure.

FIG. 13 shows a diagram of a system 1300 including a device 1305 in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, an indication of a set of candidate beam configurations for a control channel, the control channel associated with transmissions from two or more TRPs, determine, based on the set of candidate beam configurations, two or more beam configurations to activate for the control channel, transmit an indication to activate, for the control channel, the two or more beam configurations, and transmit, via the two or more TRPs based on the two or more activated beam configurations, a control signal on the control channel.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting beam configuration indication for a downlink control channel).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
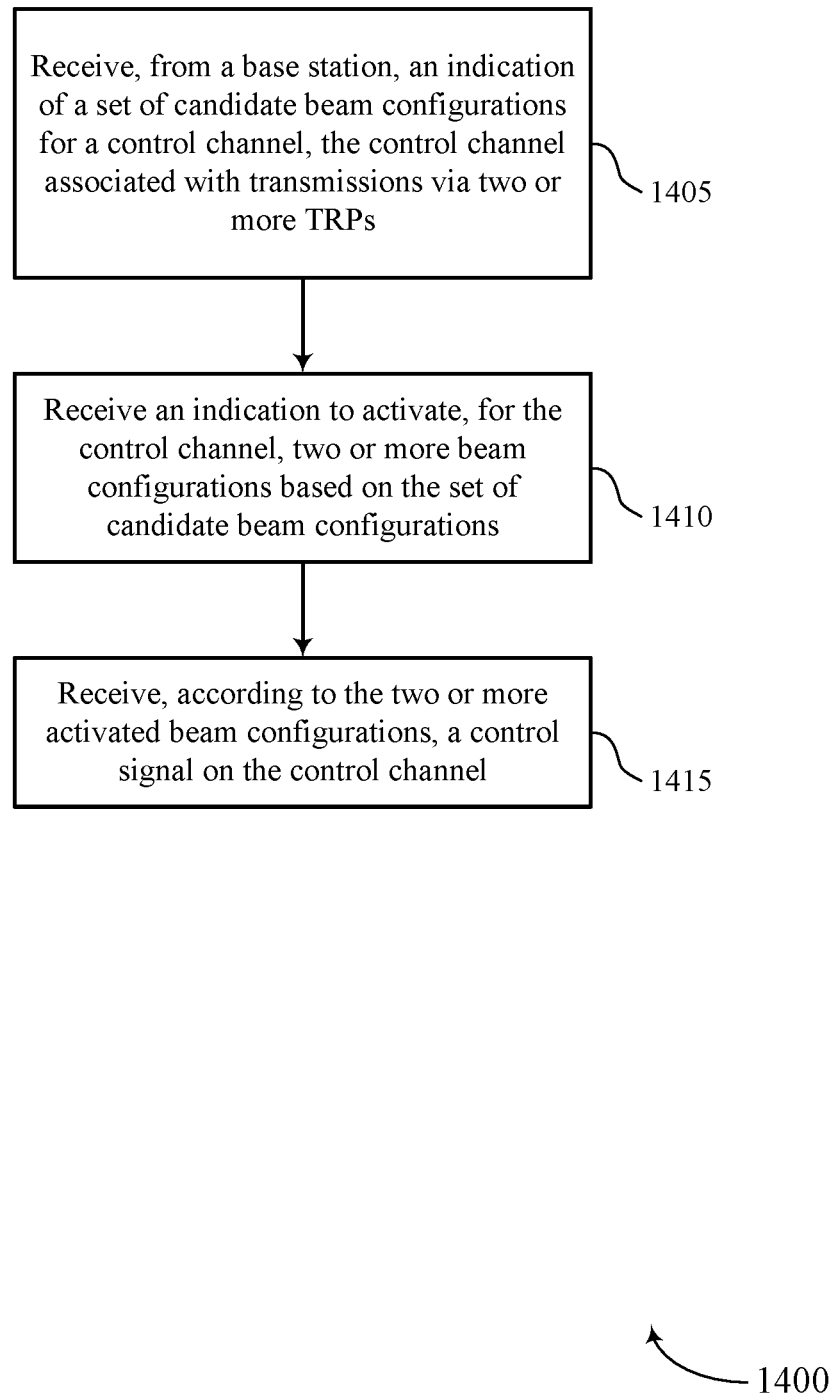
FIGS. 14 through 17 show flowcharts illustrating methods in accordance with aspects of the present disclosure.

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an indication of a set of candidate beam configurations for a control channel, the control channel associated with transmissions via two or more TRPs. The operations of 1405 may be performed according to the methods described herein. In some examples, aspects of the operations of 1405 may be performed by a configuration reception component as described with reference to FIGS. 6 through 9.

At 1410, the UE may receive an indication to activate, for the control channel, two or more beam configurations based on the set of candidate beam configurations. The operations of 1410 may be performed according to the methods described herein. In some examples, aspects of the operations of 1410 may be performed by an activation reception component as described with reference to FIGS. 6 through 9.

At 1415, the UE may receive, according to the two or more activated beam configurations, a control signal on the control channel. The operations of 1415 may be performed according to the methods described herein. In some examples, aspects of the operations of 1415 may be performed by a control signal reception component as described with reference to FIGS. 6 through 9.

Figure 15:
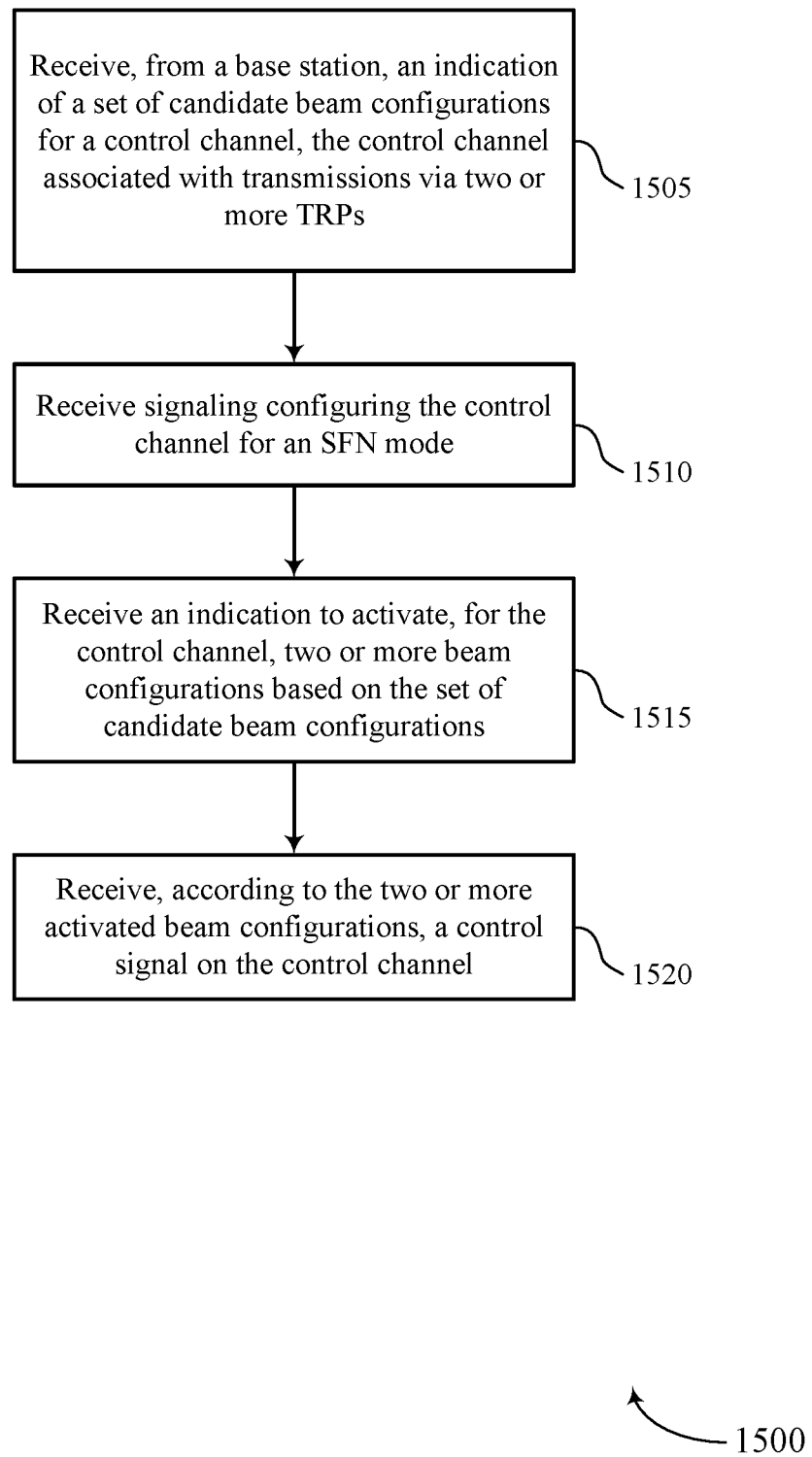

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a set of candidate beam configurations for a control channel, the control channel associated with transmissions via two or more TRPs. The operations of 1505 may be performed according to the methods described herein. In some examples, aspects of the operations of 1505 may be performed by a configuration reception component as described with reference to FIGS. 6 through 9.

At 1510, the UE may receive signaling configuring the control channel for an SFN mode. The operations of 1510 may be performed according to the methods described herein. In some examples, aspects of the operations of 1510 may be performed by a configuration reception component as described with reference to FIGS. 6 through 9.

At 1515, the UE may receive an indication to activate, for the control channel, two or more beam configurations based on the set of candidate beam configurations. The operations of 1515 may be performed according to the methods described herein. In some examples, aspects of the operations of 1515 may be performed by an activation reception component as described with reference to FIGS. 6 through 9.

At 1520, the UE may receive, according to the two or more activated beam configurations, a control signal on the control channel. The operations of 1520 may be performed according to the methods described herein. In some examples, aspects of the operations of 1520 may be performed by a control signal reception component as described with reference to FIGS. 6 through 9.

Figure 16:
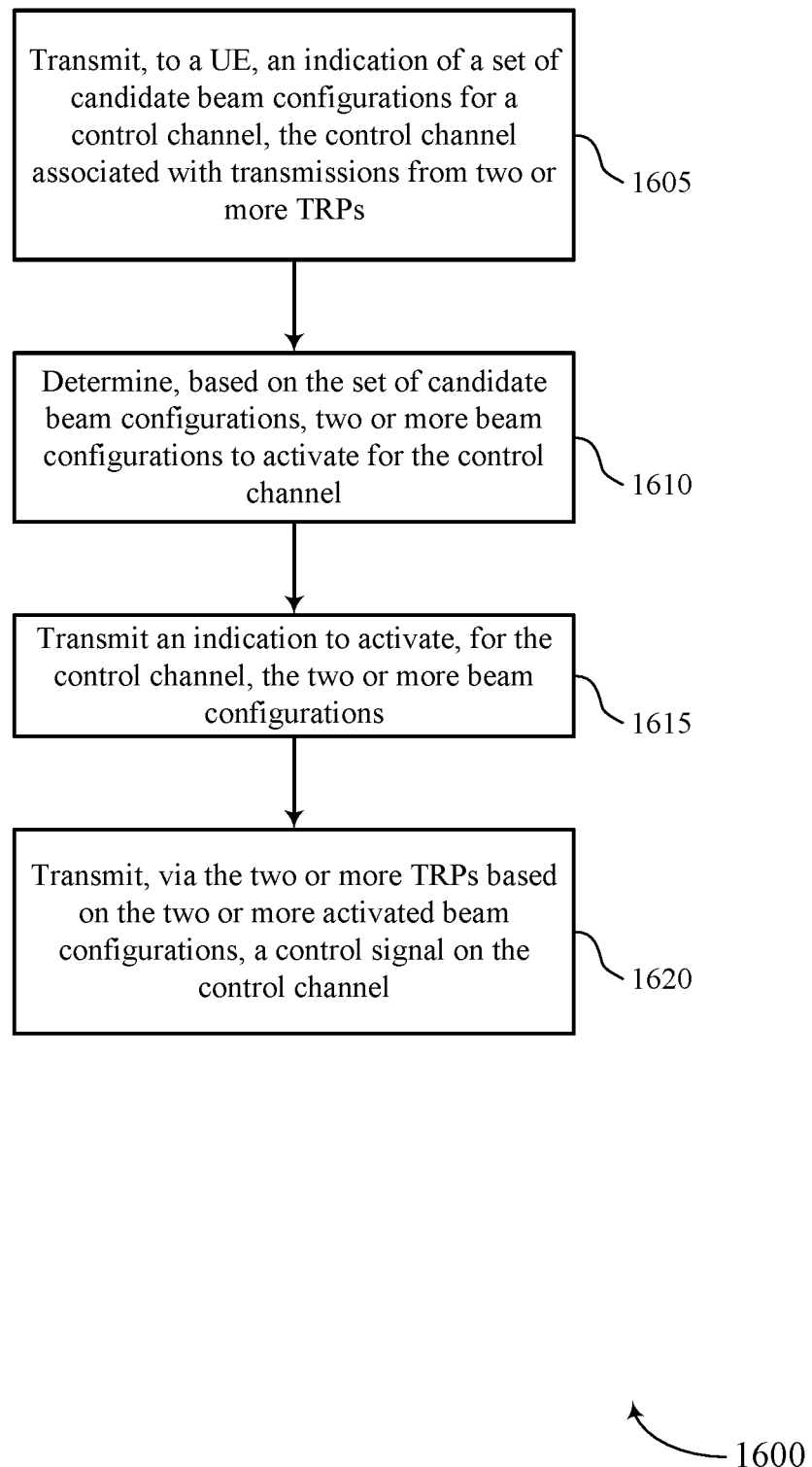

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, an indication of a set of candidate beam configurations for a control channel, the control channel associated with transmissions from two or more TRPs. The operations of 1605 may be performed according to the methods described herein. In some examples, aspects of the operations of 1605 may be performed by a configuration transmission component as described with reference to FIGS. 10 through 13.

At 1610, the base station may determine, based on the set of candidate beam configurations, two or more beam configurations to activate for the control channel. The operations of 1610 may be performed according to the methods described herein. In some examples, aspects of the operations of 1610 may be performed by a beam configuration determination component as described with reference to FIGS. 10 through 13.

At 1615, the base station may transmit an indication to activate, for the control channel, the two or more beam configurations. The operations of 1615 may be performed according to the methods described herein. In some examples, aspects of the operations of 1615 may be performed by an activation transmission component as described with reference to FIGS. 10 through 13.

At 1620, the base station may transmit, via the two or more TRPs based on the two or more activated beam configurations, a control signal on the control channel. The operations of 1620 may be performed according to the methods described herein. In some examples, aspects of the operations of 1620 may be performed by a control signal transmission component as described with reference to FIGS. 10 through 13.

Figure 17:
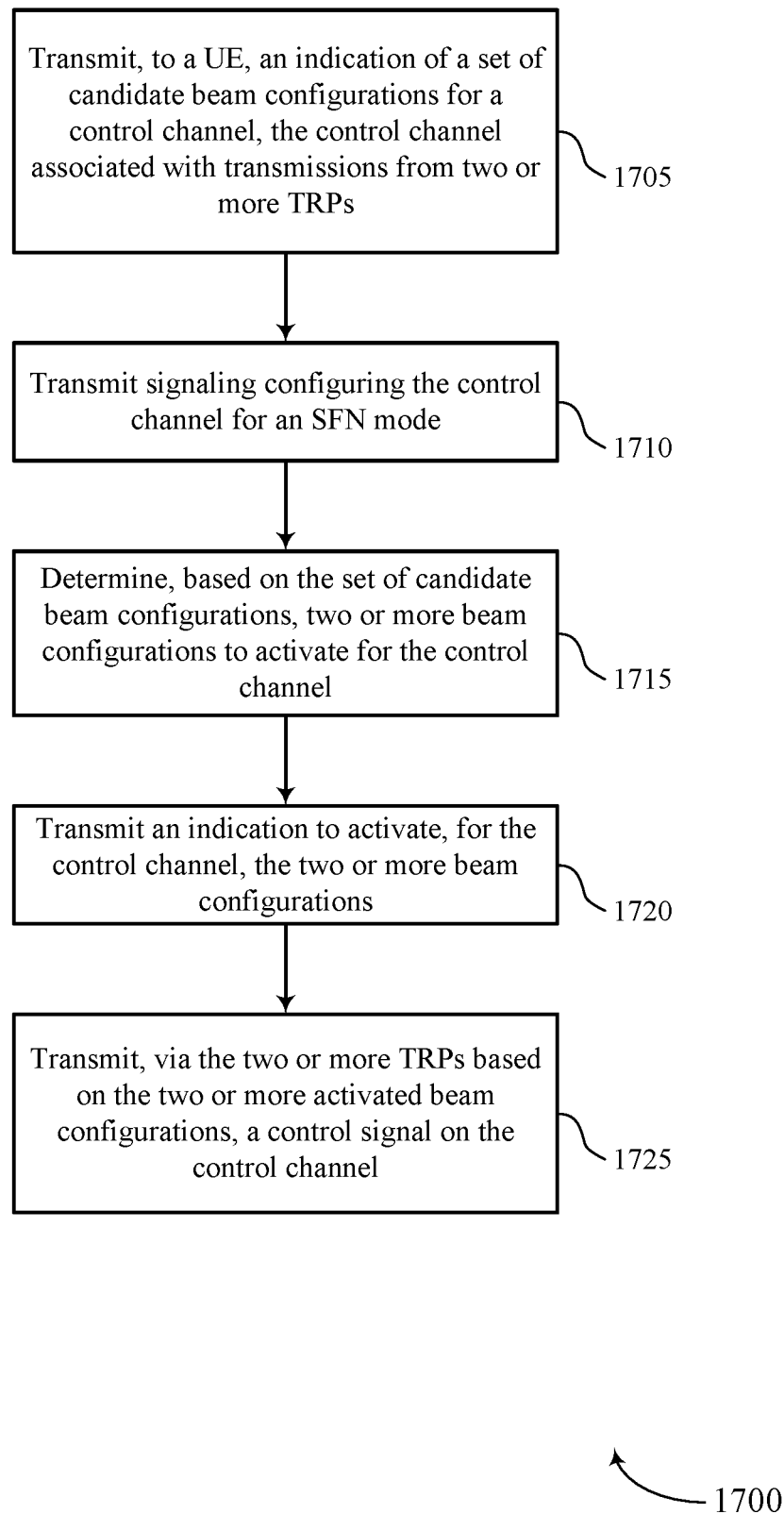

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, an indication of a set of candidate beam configurations for a control channel, the control channel associated with transmissions from two or more TRPs. The operations of 1705 may be performed according to the methods described herein. In some examples, aspects of the operations of 1705 may be performed by a configuration transmission component as described with reference to FIGS. 10 through 13.

At 1710, the base station may transmit signaling configuring the control channel for an SFN mode. The operations of 1710 may be performed according to the methods described herein. In some examples, aspects of the operations of 1710 may be performed by a configuration transmission component as described with reference to FIGS. 10 through 13.

At 1715, the base station may determine, based on the set of candidate beam configurations, two or more beam configurations to activate for the control channel. The operations of 1715 may be performed according to the methods described herein. In some examples, aspects of the operations of 1715 may be performed by a beam configuration determination component as described with reference to FIGS. 10 through 13.

At 1720, the base station may transmit an indication to activate, for the control channel, the two or more beam configurations. The operations of 1720 may be performed according to the methods described herein. In some examples, aspects of the operations of 1720 may be performed by an activation transmission component as described with reference to FIGS. 10 through 13.

At 1725, the base station may transmit, via the two or more TRPs based on the two or more activated beam configurations, a control signal on the control channel. The operations of 1725 may be performed according to the methods described herein. In some examples, aspects of the operations of 1725 may be performed by a control signal transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, an indication of a plurality of candidate beam configurations for a control channel, the control channel associated with transmissions via two or more transmission and reception points;
   receiving signaling configuring two or more downlink reference signals for a quasi co-location type of a transmission configuration indicator state for the control channel;
   receiving an indication to activate, for the control channel, two or more beam configurations associated with the plurality of candidate beam configurations; and
   receiving, according to the two or more activated beam configurations, a control signal on the control channel.

2. The method of claim 1, wherein receiving the indication of the plurality of candidate beam configurations for the control channel comprises:
   receiving signaling configuring the control channel for a single frequency network mode.

3. The method of claim 2, wherein the signaling configuring the control channel for the single frequency network mode configures the single frequency network mode for one or more of a search space associated with the control channel or a bandwidth part associated with the control channel.

4. A method for wireless communication at a base station, comprising:
   transmitting, to a user equipment (UE), an indication of a plurality of candidate beam configurations for a control channel, the control channel associated with transmissions from two or more transmission and reception points;
   transmitting signaling configuring two or more downlink reference signals for a quasi co-location type of a transmission configuration indicator state for the control channel;
   determining two or more beam configurations associated with the plurality of candidate beam configurations to activate for the control channel;
   transmitting an indication to activate, for the control channel, the two or more beam configurations; and
   transmitting, via the two or more transmission and reception points according to the two or more activated beam configurations, a control signal on the control channel.

5. The method of claim 4, wherein transmitting the indication of the plurality of candidate beam configurations for the control channel comprises:
   transmitting signaling configuring the control channel for a single frequency network mode.

6. The method of claim 5, wherein the signaling configuring the control channel for the single frequency network mode configures the single frequency network mode for one or more of a search space associated with the control channel or a bandwidth part associated with the control channel.

7. An apparatus for wireless communication at a user equipment (UE), comprising:
   a processing system that includes one or more processors and one or more memories coupled with the one or more processors, the processing system configured to cause the apparatus to:

receive, from a base station, an indication of a plurality of candidate beam configurations for a control channel, the control channel associated with transmissions via two or more transmission and reception points;

receive signaling configuring two or more downlink reference signals for a quasi co-location type of a transmission configuration indicator state for the control channel;

receive an indication to activate, for the control channel, two or more beam configurations associated with the plurality of candidate beam configurations; and receive, according to the two or more activated beam configurations, a control signal on the control channel.

8. The apparatus of claim 7, wherein the processing system configured to receive the indication of the plurality of candidate beam configurations for the control channel is further configured to cause the apparatus to:

receive signaling configuring the control channel for a single frequency network mode.

9. The apparatus of claim 8, wherein the signaling configuring the control channel for the single frequency network mode configures the single frequency network mode for one or more of a search space associated with the control channel or a bandwidth part associated with the control channel.

10. The apparatus of claim 7, wherein the processing system is further configured to cause the apparatus to:

receive, via the signaling, an indication of two or more instances of quasi co-location information for the quasi co-location type, each instance of quasi co-location information associated with a respective downlink reference signal of the two or more downlink reference signals.

11. The apparatus of claim 7, wherein the processing system is further configured to cause the apparatus to:

receive, via the signaling, an indication that an instance of quasi co-location information for the quasi co-location type is associated with the two or more downlink reference signals.

12. The apparatus of claim 7, wherein the indication of the plurality of candidate beam configurations for the control channel comprises the processing system configured to cause the apparatus to:

receive an indication of a second plurality of candidate beam configurations for a shared channel associated with the control channel, the second plurality of candidate beam configurations comprising the plurality of candidate beam configurations.

13. The apparatus of claim 7, wherein the processing system configured to receive the indication to activate the two or more beam configurations is further configured to cause the apparatus to:

receive an indication to activate each of the plurality of candidate beam configurations for the control channel, wherein the plurality of candidate beam configurations comprises the two or more activated beam configurations.

14. The apparatus of claim 7, wherein the processing system configured to receive the indication to activate the two or more beam configurations is further configured to cause the apparatus to:

receive an indication to activate one of the plurality of candidate beam configurations for the control channel and one or more other beam configurations.

15. The apparatus of claim 7, wherein the processing system configured to receive the indication to activate the two or more beam configurations is further configured to cause the apparatus to:

receive an indication to activate two or more of the plurality of candidate beam configurations for the control channel, the two or more of the plurality of candidate beam configurations comprising the two or more activated beam configurations.

16. The apparatus of claim 7, wherein the processing system configured to receive the indication to activate the two or more beam configurations is further configured to cause the apparatus to:

receive an indication to activate two or more other beam configurations different from any of the plurality of candidate beam configurations for the control channel, the two or more other beam configurations comprising the two or more activated beam configurations.

17. The apparatus of claim 7, wherein the processing system configured to receive the indication is further configured to cause the apparatus to:

receive a control resource set configuration indicating the plurality of candidate beam configurations for the control channel.

18. The apparatus of claim 17, wherein the control resource set configuration indicates that more than sixty-four transmission configuration indicator states are configurable for the control channel.

19. The apparatus of claim 7, wherein the plurality of candidate beam configurations is associated with a single frequency network state.

20. The apparatus of claim 7, wherein the indication of the plurality of candidate beam configurations is received in radio resource control signaling.

21. The apparatus of claim 7, wherein the indication to activate the two or more beam configurations is received in a medium access control element.

22. An apparatus for wireless communication at a base station, comprising:

a processing system that includes one or more processors and one or more memories coupled with the one or more processors, the processing system configured to cause the apparatus to:

transmit, to a user equipment (UE), an indication of a plurality of candidate beam configurations for a control channel, the control channel associated with transmissions from two or more transmission and reception points;

transmit signaling configuring two or more downlink reference signals for a quasi co-location type of a transmission configuration indicator state for the control channel;

determine two or more beam configurations associated with the plurality of candidate beam configurations to activate for the control channel;

transmit an indication to activate, for the control channel, the two or more beam configurations; and transmit, via the two or more transmission and reception points according to the two or more activated beam configurations, a control signal on the control channel.

23. The apparatus of claim 22, wherein the processing system configured to transmit the indication of the plurality of candidate beam configurations for the control channel is further configured to cause the apparatus to:

transmit signaling configuring the control channel for a single frequency network mode.

24. The apparatus of claim 22, wherein the processing system configured to transmit the indication of the plurality of candidate beam configurations for the control channel is further configured to cause the apparatus to:

transmit an indication of a second plurality of candidate beam configurations for a shared channel associated with the control channel, the second plurality of candidate beam configurations comprising the plurality of candidate beam configurations.

25. The apparatus of claim 22, wherein the processing system configured to transmit the indication to activate the two or more beam configurations is further configured to cause the apparatus to:

transmit an indication to activate each of the plurality of candidate beam configurations for the control channel, wherein the plurality of candidate beam configurations comprises the two or more activated beam configurations.

26. The apparatus of claim 22, wherein the processing system configured to transmit the indication to activate the two or more beam configurations is further configured to cause the apparatus to:

transmit an indication to activate one of the plurality of candidate beam configurations for the control channel and one or more other beam configurations.

27. The apparatus of claim 22, wherein the processing system configured to transmit the indication to activate the two or more beam configurations is further configured to cause the apparatus to:

transmit an indication to activate two or more of the plurality of candidate beam configurations for the control channel, the two or more of the plurality of candidate beam configurations comprising the two or more activated beam configurations.

28. The apparatus of claim 22, wherein the processing system configured to transmit the indication to activate the two or more beam configurations is further configured to cause the apparatus to:

transmit an indication to activate two or more other beam configurations different from any of the plurality of candidate beam configurations for the control channel, the two or more other beam configurations comprising the two or more activated beam configurations.

* * * * *